(12) United States Patent
Daily et al.

(10) Patent No.: US 11,552,488 B2
(45) Date of Patent: Jan. 10, 2023

(54) CHARGING SYSTEM FOR A MOBILE DEVICE

(71) Applicant: TE CONNECTIVITY CORPORATION, Berwyn, PA (US)

(72) Inventors: Christopher George Daily, Harrisburg, PA (US); Matthew Edward Mostoller, Hummelstown, PA (US); Edward John Howard, Millersburg, PA (US)

(73) Assignee: TE CONNECTIVITY SOLUTIONS GmbH, Schaffhausen (CH)

( * ) Notice: Subject to any disclaimer, the term of this patent is extended or adjusted under 35 U.S.C. 154(b) by 315 days.

(21) Appl. No.: 15/930,568

(22) Filed: May 13, 2020

(65) Prior Publication Data
US 2020/0389039 A1    Dec. 10, 2020

Related U.S. Application Data

(60) Provisional application No. 62/858,545, filed on Jun. 7, 2019.

(51) Int. Cl.
*H01R 13/64* (2006.01)
*H02J 7/00* (2006.01)
*H01R 13/631* (2006.01)
*H01R 13/74* (2006.01)

(52) U.S. Cl.
CPC ........ *H02J 7/0045* (2013.01); *H01R 13/6315* (2013.01); *H01R 13/74* (2013.01)

(58) Field of Classification Search
CPC .. H01R 12/91; H01R 13/6315; H01R 13/741; H01R 13/743; H01R 13/64; H01R 13/74; H01R 33/0872; H02J 7/0045; H02J 7/0042
See application file for complete search history.

(56) References Cited

U.S. PATENT DOCUMENTS

| 4,479,691 | A | * | 10/1984 | Smith, Jr. | H01R 24/76 439/744 |
| 4,664,456 | A | * | 5/1987 | Blair | H01R 13/193 439/378 |
| 4,761,144 | A | * | 8/1988 | Hunt, III | H01R 13/74 29/825 |
| 4,781,626 | A | * | 11/1988 | Lazarchik | H01R 13/64 439/680 |

(Continued)

OTHER PUBLICATIONS

European Search Report, dated Oct. 9, 2020, EP 20 17 7650, International Application No. 20177650.7-1205.

*Primary Examiner* — Thanh Tam T Le

(57) ABSTRACT

A supply charging device includes a supply power connector having a housing with a mating end and a flange configured to be mounted to a panel. The housing includes power contact channels extending through a base receiving power contacts. The housing includes a guide member engaging a guide feature of a mobile device to locate a receiver power connector relative to the supply power connector. The supply charging device includes a retaining plate securing the housing to the panel. The supply charging device includes a mounting spring extending from the housing and received in the panel cutout. The mounting spring engages the panel to allow the supply power connector to float relative to the panel within the panel cutout for aligning the mating end of the supply power connector with the receiver power connector.

20 Claims, 21 Drawing Sheets

(56) References Cited

U.S. PATENT DOCUMENTS

| | | | | |
|---|---|---|---|---|
| 4,812,133 A * | 3/1989 | Fleak | H01R 13/6315 | 439/565 |
| 5,002,497 A * | 3/1991 | Plocek | H01R 13/6315 | 439/247 |
| 5,071,374 A * | 12/1991 | Plocek | H01R 13/4368 | 439/247 |
| 5,197,896 A * | 3/1993 | Landis | H01R 13/6315 | 439/247 |
| 5,199,900 A * | 4/1993 | Hayes, Sr. | H01R 13/4365 | 439/247 |
| 5,263,871 A * | 11/1993 | Sano | H01R 13/62933 | 439/549 |
| 5,277,623 A * | 1/1994 | Colleran | H01R 13/743 | 248/222.12 |
| 5,514,000 A * | 5/1996 | Krause | H01R 13/6315 | 439/248 |
| 5,575,673 A * | 11/1996 | Dahlem | H01R 13/6315 | 439/248 |
| 5,697,805 A * | 12/1997 | Orstad | H01R 13/629 | 439/374 |
| 5,800,208 A * | 9/1998 | Ishizuka | H01R 13/743 | 439/557 |
| 6,033,247 A * | 3/2000 | Gregory, II | H01R 13/6315 | 439/247 |
| 6,139,346 A * | 10/2000 | Cecil, Jr. | H01R 13/745 | 439/247 |
| 6,146,184 A * | 11/2000 | Wilson | H01R 12/7005 | 439/248 |
| 6,312,285 B1 * | 11/2001 | Berg | H01R 13/74 | 439/545 |
| 6,848,925 B2 * | 2/2005 | Nishide | H01R 13/73 | 439/157 |
| 7,182,637 B2 * | 2/2007 | Coyle, Jr. | H01R 13/743 | 439/682 |
| 7,361,041 B2 * | 4/2008 | Hashiguchi | H01R 13/6315 | 439/247 |
| 7,481,676 B2 * | 1/2009 | Walter | H01R 13/518 | 439/607.01 |
| 7,607,929 B1 | 10/2009 | Nguyen | | |
| 8,002,574 B1 | 8/2011 | Yi | | |
| 9,431,756 B2 * | 8/2016 | Kataoka | H01R 13/5219 | |
| 9,559,461 B1 | 1/2017 | Diehr | | |
| 2008/0276407 A1 | 11/2008 | Schnittman et al. | | |
| 2011/0256748 A1 | 10/2011 | Davison et al. | | |
| 2018/0212558 A1 | 7/2018 | Meller et al. | | |
| 2019/0092184 A1 | 3/2019 | Sussman et al. | | |

\* cited by examiner

CHARGING SYSTEM FOR A MOBILE DEVICE

CROSS REFERENCE TO RELATED APPLICATIONS

This application claims benefit to U.S. Provisional Application No. 62/858,545, filed 7 Jun. 2019, titled "CHARGING SYSTEM FOR A MOBILE DEVICE", the subject matter of which is herein incorporated by reference in its entirety.

BACKGROUND OF THE INVENTION

The subject matter herein relates generally to charging systems for mobile devices.

Mobile devices, such as autonomous mobile robots, are movable within an environment to perform a task. However, the mobile devices need to be recharged from time to time. The mobile devices are returned to a charging device to supply power to the mobile device and recharge the batteries of the mobile device. As the mobile device returns to the charging station, the charging connector of the mobile device needs to be aligned with the charging connector of the charging station. However, when the mobile device is misaligned with the charging station, the mobile device is unable to recharge.

A need remains for a charging system capable of aligning the charging connector of a mobile device with the charging connector of a charging station.

BRIEF DESCRIPTION OF THE INVENTION

In one embodiment, a supply charging device for a mobile device is provided. The supply charging device includes a supply power connector having a housing extending between a front and a rear. The supply power connector has a mating end at the front. The housing has a flange that is configured to be mounted to a panel. The housing has a base extending rearward from the flange through a panel cutout in the panel. The housing includes power contact channels extending through the base. The housing includes a guide member extending forward from the flange. The guide member engages a guide feature of the mobile device to locate a receiver power connector of the mobile device relative to the supply power connector of the mobile device. The supply power connector includes power contacts received in the power contact channels. The supply charging device includes a retaining plate coupled to the rear of the housing. A panel gap is defined between the retaining plate and the rear of the housing with the panel received between the flange and the retaining plate. The supply charging device includes a mounting spring coupled to the housing. The mounting spring extends rearward of the flange. The mounting spring is received in the panel cutout. The mounting spring engages the panel to allow the supply power connector to float relative to the panel within the panel cutout for aligning the mating end of the supply power connector with the receiver power connector.

In another embodiment, a charging system is provided. The charging system includes a mobile charging device including a receiver power connector having a receiver housing extending between a front and a rear. The receiver power connector has a mating end at the front. The receiver housing has a receiver flange configured to be mounted to a body of a mobile device. The receiver housing has a receiver base extending rearward from the receiver flange through a body cutout in the body of the mobile device. The receiver housing includes receiver power contact channels extending through the receiver base. The receiver housing includes a funnel having an opening. The funnel has angled guide walls between the opening and a receptacle at the receiver base. The receiver power connector includes receiver power contacts received in the receiver power contact channels. The receiver power contacts extend into the receptacle. The charging system includes a supply charging device including a supply power connector having a supply housing extending between a front and a rear. The supply power connector has a mating end at the front. The supply housing has a supply flange configured to be mounted to a panel. The supply housing has a supply base extending rearward from the supply flange through a panel cutout in the panel. The supply housing includes supply power contact channels extending through the supply base. The supply housing includes a guide member extending forward from the flange. The guide member is received in the funnel of the receiver housing through the opening to locate the supply charging device relative to the receiver charging device. The supply power connector includes supply power contacts received in the supply power contact channels. The mating end of the supply power connector is received in the receptacle such that the supply power contacts are mated to the receiver power contacts. The supply charging device includes a retaining plate coupled to the rear of the supply housing used to mount the supply power connector to the panel. The supply charging device includes a mounting spring coupled to the supply housing. The mounting spring extends rearward of the supply flange. The mounting spring engages the panel to allow the supply power connector to float relative to the panel for aligning the mating end of the supply power connector with the receiver power connector.

In a further embodiment, an autonomous mobile device is provided. The mobile device includes a mobile body movable relative to a supply charging device to perform a task and return to the supply charging device to recharge the autonomous mobile device. The mobile device includes a mobile charging device mounted to the mobile body. The mobile charging device is mated to the supply charging device to recharge the autonomous mobile device. The mobile charging device includes a receiver power connector having a receiver housing extending between a front and a rear. The receiver power connector has a mating end at the front. The receiver housing has a receiver flange mounted to the mobile body. The receiver housing has a receiver base extending rearward from the receiver flange through a body cutout in the mobile body. The receiver housing includes receiver power contact channels extending through the receiver base. The receiver housing includes a funnel having an opening. The funnel has angled guide walls between the opening and a receptacle at the receiver base. The receiver power connector includes receiver power contacts received in the receiver power contact channels. The receiver power contacts extend into the receptacle. The mobile device includes a supply charging device including a supply power connector having a supply housing extending between a front and a rear. the supply power connector has a mating end at the front. The supply housing has a supply flange configured to be mounted to a panel. The supply housing has a supply base extending rearward from the supply flange through a panel cutout in the panel. The supply housing includes supply power contact channels extending through the supply base. The supply housing includes a guide member extending forward from the flange. The guide member is received in the funnel of the receiver housing through the opening to locate the supply charging device relative to the receiver charging device. The supply power connector includes supply power contacts received in the supply power contact channels. The mating end of the supply power connector is received in the receptacle such that the supply power contacts are mated to the receiver power contacts. The supply charging device includes a retaining plate coupled to the rear of the supply housing used to mount the supply power connector to the panel. The supply charging device includes a mounting spring coupled the supply housing. The mounting spring extends rearward of the supply flange. The mounting spring engages the panel to allow the supply power connector to float relative to the panel for aligning the mating end of the supply power connector with the receiver power connector.

DETAILED DESCRIPTION OF THE INVENTION

Figure 1:
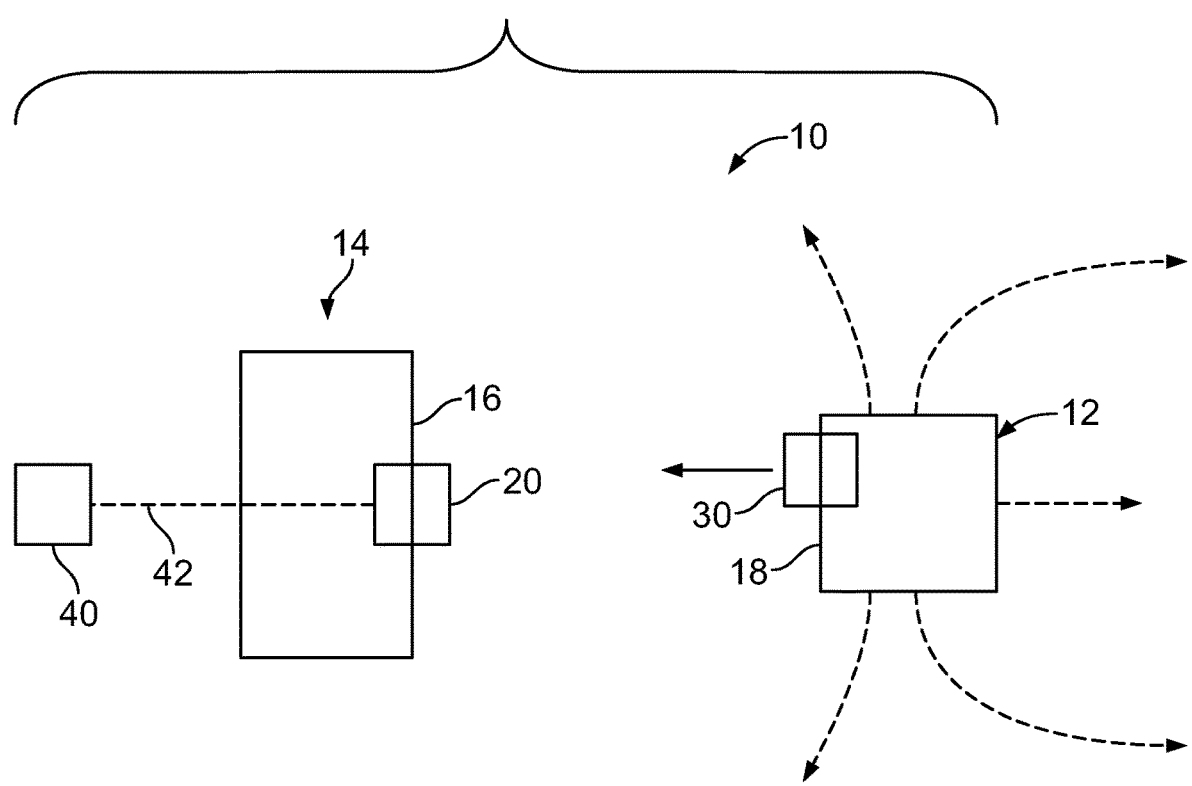
FIG. 1 illustrates a charging system for charging a mobile device in accordance with an exemplary embodiment.

FIG. 1 illustrates a charging system 10 for charging a mobile device 12 in accordance with an exemplary embodiment. The charging system 10 includes a supply charging device 20 and a mobile charging device 30. The mobile charging device 30 is provided on the mobile device 12. The supply charging device 20 is provided on a charging component 14. The charging component 14 may be fixed, such as to a wall or panel 16. In other various embodiments, the charging component 14 may be a movable charging component, such as a charging station. The charging component 14 may be provided in a room or building in a fixed location and the mobile device 12 may be separated from the charging component 14 and returned to the charging component 14 to recharge the mobile device 12. The supply charging device 20 receives power from a power supply 40, such as via a power wires 42 routed between the power supply 40 and the supply charging device 20.

In an exemplary embodiment, the mobile device 12 is an autonomous mobile device that is movable within an environment to perform a task and return to the supply charging device 20 to charge the autonomous mobile device 12. For example, the mobile charging device 30 may be mated to the supply charging device 20 to recharge the mobile device 12. In various embodiments, the mobile device 12 may be a mobile robot, such as for used to perform tasks in a factory, a hotel, a store or another environment. For example, the mobile robot may be used to scan items on shelves, deliver items from one location to another location, or perform other tasks. The mobile charging device 30 is mounted to a body 18 of the mobile device 12. In various embodiments, the mobile charging device 30 may have a limited amount of floating movement relative to the body 18 to align the mobile charging device 30 relative to the supply charging device 20 during mating.

In an exemplary embodiment, the supply charging device 20 is capable of accommodating misalignment of the mobile charging device 30 when the mobile device 12 returns to the charging component 14 by moving or floating relative to the panel 16 to align the supply charging device 20 with the mobile charging device 30. The supply charging device 20 may allow floating movement relative to the panel 16 of approximately 10 mm or more.

Figure 2:
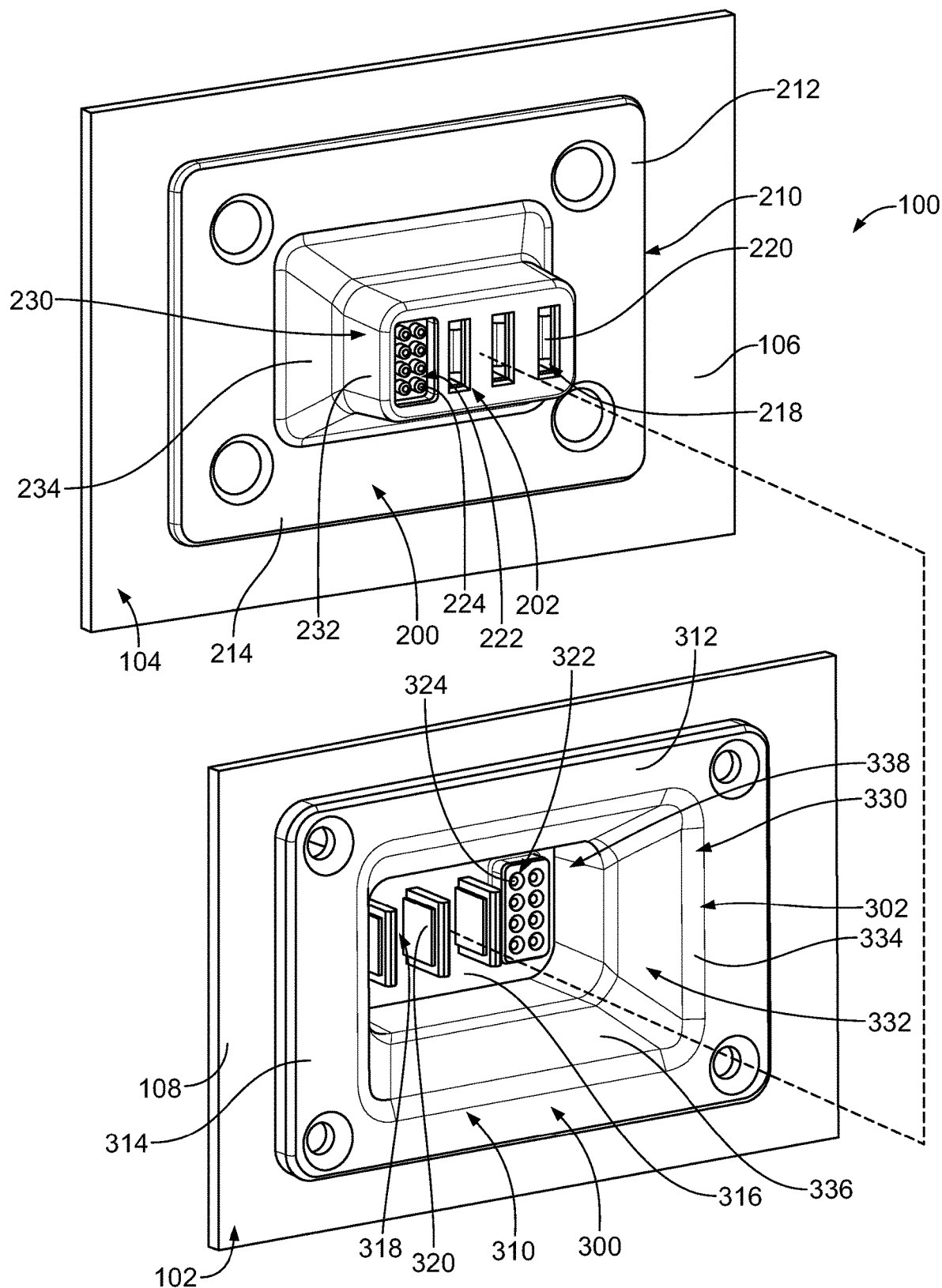
FIG. 2 illustrates a charging system for charging a mobile device in accordance with an exemplary embodiment.

FIG. 2 illustrates a charging system 100 for charging a mobile device 102 in accordance with an exemplary embodiment. The charging system 100 includes a supply charging device 200 and a mobile charging device 300. The mobile charging device 300 is provided on the mobile device 102 and includes a mating end 302 configured to be mated with the supply charging device 200. The supply charging device 200 is provided on a charging component 104 and includes a mating end 202 configured to be mated with the mobile charging device 300. The supply charging device 200 is coupled to a panel 106 of the charging component 104. The mobile charging device 300 is coupled to a body 108 of the mobile device 102. The mobile device 102 is configured to be separated from the charging component 104 and returned to the charging component 104 to recharge the mobile device 102.

The mobile charging device 300 receives power from the supply charging device 200 when coupled thereto. The mobile charging device 300 includes a receiver power connector 310 having a receiver housing 312. The receiver housing 312 has a receiver flange 314 configured to be mounted to the body 108 of the mobile device 102. The receiver housing 312 has a receiver base 316 including receiver power contact channels 318 that hold receiver power contacts 320. In the illustrated embodiment, the receiver power contacts 320 are illustrated as blade contacts; however, other types of power contacts may be used in alternative embodiments, such as pins, sockets, spring beams, and the like. The receiver housing 312 includes receiver signal contact channels 322 that hold receiver signal contacts 324.

The receiver housing 312 includes a guide feature 330 to guide mating of the mobile charging device 300 with the supply charging device 200. In an exemplary embodiment, the guide feature 330 includes a funnel 332 having an opening 334. The funnel 332 has angled guide walls 336 between the opening 334 and a receptacle 338 at the receiver base 316. In the illustrated embodiment, the guide walls 336 are provided on all four sides of the funnel 332 to guide mating from above, from below, from a first side and from a second side (for example, providing X and Y guidance). The receiver power contacts 320 extend into the receptacle 338 for mating with the supply charging device 200. The guide walls 336 guide alignment of the supply charging device 200 and the mobile charging device 300 with the mobile device 102 returns to the charging component 104.

In an exemplary embodiment, the funnel 332 is wider and taller than the receptacle 338 to gather the supply charging device 200 during mating. The funnel 332 accommodates misalignment of the mobile charging device 300 with the supply charging device 200 during mating. In an exemplary embodiment, the funnel 332 accommodates horizontal misalignment (for example, misalignment from either side) and accommodates vertical misalignment (for example, misalignment from above or from below). For example, the funnel 332 has additional width relative to the receptacle 338 at both sides and has additional height relative to the receptacle 338 from both above and below.

The supply charging device 200 includes a supply power connector 210 having a supply housing 212. The supply housing 212 has a supply flange 214 configured to be mounted to the panel 106. The supply housing 212 includes supply power contact channels 218 that receive supply power contacts 220. The supply housing 212 includes supply signal contact channels 222 that receive supply signal contacts 224. In the illustrated embodiment, the supply power contacts 220 are illustrated as dual spring beam contacts; however, other types of power contacts may be used in alternative embodiments, such as pins, sockets, blades, and the like. The supply power contact 220 and the supply signal contact 224 are configured to be electrically connected to the receiver power contacts 320 and the receiver signal contacts 324 when the mobile charging device 300 is mated with the supply charging device 200.

The supply housing 212 includes a guide member 230 extending forward from the flange 214. The guide member 230 is configured to be received in the funnel 332 of the receiver housing 312 through the opening 334 to locate the supply charging device 200 relative to the mobile charging device 300. In an exemplary embodiment, the guide member 230 includes a nose 232 and a cone 234 extending between the nose 232 and the flange 214. The nose 232 is configured to be received in the receptacle 338. The nose 232 may have a complementary shape to the receptacle 338. The cone 234 is configured to engage the funnel 332 to position the guide member 230 in the guide feature 330. The cone 234 may have a complementary shape to the funnel 332.

Figure 3:
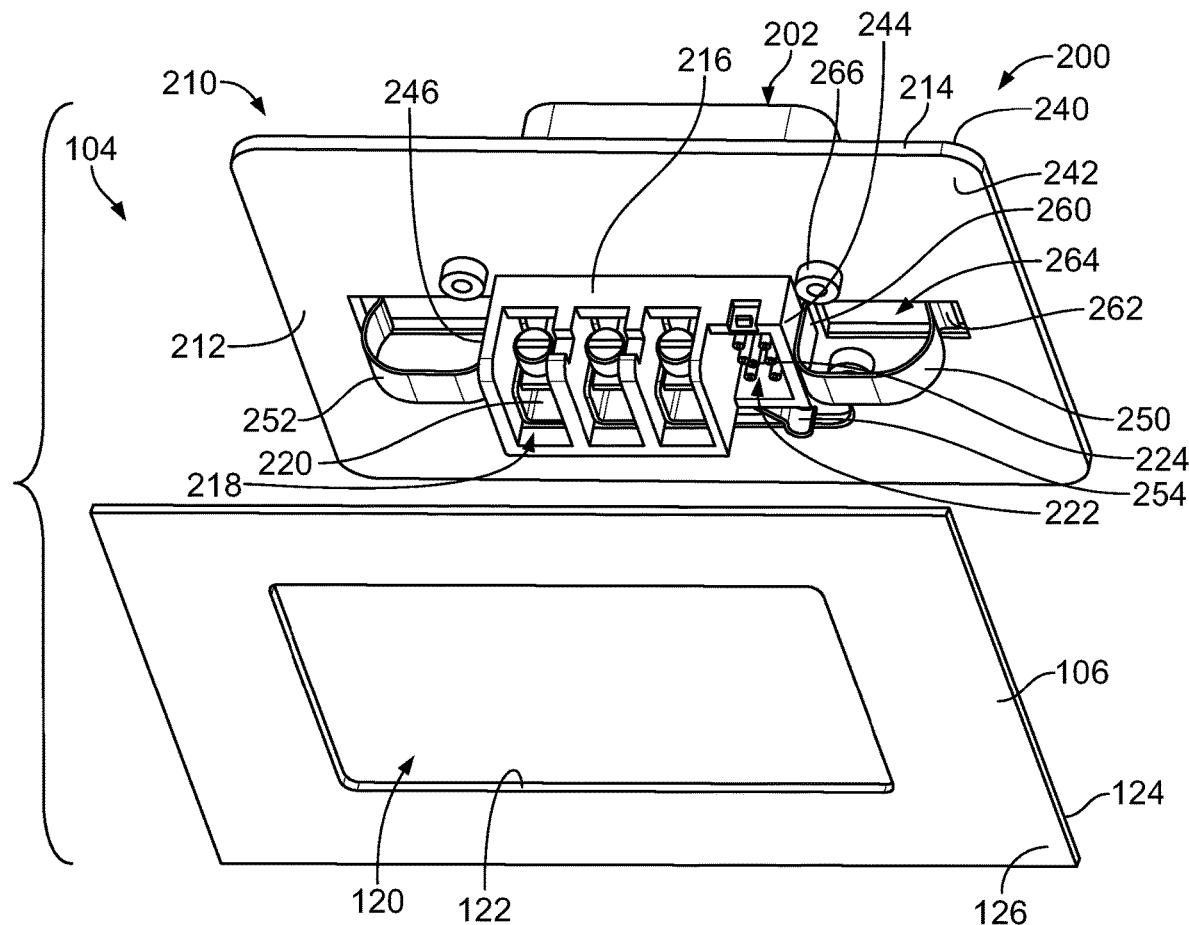
FIG. 3 is a rear perspective view of a charging component showing a portion of a supply charging device configured to be mated to a panel in accordance with an exemplary embodiment.

FIG. 3 is a rear perspective view of the charging component 104 showing a portion of the supply charging device 200 configured to be mated to the panel 106. The panel 106 includes a panel cutout 120 configured to receive the supply charging device 200. The panel cutout 120 is defined by edges 122 extending between a front 124 and a rear 126 of the panel 106. The front 124 faces an exterior of the charging component 104 and the rear 126 faces an interior of the charging component 104.

The supply housing 212 extends between a front 240 and a rear 242. The mating end 202 is provided at the front 240 of the supply housing 212. The supply housing 212 includes a supply base 216 extending rearward from the supply flange 214 to the rear 242 of the supply housing 212. The supply power contact channels 218 and the supply signal contact channels 222 extend through the supply base 216. The supply power contacts 220 are located in the supply base 216 and/or extend rearward from the supply base 216 for termination to power wires or a power connector. In the illustrated embodiment, the supply power contacts 220 include wire clamps configured to receive power wires. Other types of terminations may be provided in alternative embodiments, such as crimped contacts, insulation displacement contacts, pin contacts, socket contacts, solder contacts, surface mount contacts, and the like. The supply housing 212 includes separating walls between the supply power contacts 220 to electrically isolate the supply power contacts 220, such as to prevent electrical arcing. The supply housing 212 includes separating walls between the supply power contact 228 and the supply signal contacts 224 to electrically isolate the supply power contacts 220 from the supply signal contacts 224. The supply signal contacts 224 are located in the supply base 216 and/or extend rearward from the supply base 216 for termination to signal wires or a signal connector. The supply signal contacts 224 may include pins configured to be mated to sockets terminated to ends of the signal wires. The supply signal contacts 224 may include crimp barrels configured to be crimped to signal wires. Other types of terminations may be provided in alternative embodiments, such as wire clamps, insulation displacement contacts, pin contacts, socket contacts, and the like.

In an exemplary embodiment, the supply charging device 200 includes mounting springs 250, 252, 254 coupled to the supply housing 212 at the rear 242 of the supply housing 212. The mounting springs 250, 252, 254 are configured to engage the panel 106 to allow the supply power connector 210 to float relative to the panel 106 for alignment of the mating end 202 of the supply power connector 210 with the receiver power connector 310 (shown in FIG. 2). The mounting springs 250, 252, 254 are compressible to allow the supply housing 212 to move relative to the panel 106 to change a position of the mating end 202 of the supply power connector 210 relative to the panel 106 for mating with the receiver power connector 310. In the illustrated embodiment, the mounting spring 250 is located at a first side 244 of the base 216, the mounting spring 252 is located at a second side 246 of the base 216, and the mounting spring 254 is located below the base 216. Other locations are possible in alternative embodiments. For example, a mounting spring may additionally or alternatively be provided above the base 216 in alternative embodiments.

The mounting spring 250 includes a fixed end 260 coupled to the supply housing 212 and a free end 262 configured to be coupled to the panel 106. The mounting spring 250 is compressible such that the free end 262 is movable relative to the fixed end 260, such as in a direction toward the fixed end 260. In an exemplary embodiment, the supply housing 212 includes a slot 264 at the rear 242 that receives the free end 262 of the mounting spring 250. The free end 262 is slidable within the slot 264. The slot 264 controls movement of the free end 262 relative to the fixed end 260.

In an exemplary embodiment, the supply housing 212 includes locating features 266 extending from the supply flange 214 at the rear 242. In the illustrated embodiment, the locating features 266 are cylindrical posts. Other types of locating features may be used in alternative embodiments. The locating features 266 may be provided on the supply base 216 in alternative embodiments. The locating features 266 are configured be received in the panel cutout 120 and are used to locate the supply power connector 210 relative to the panel 106. For example, the locating features 266 may engage the edges 122 to control or limit floating movement of the supply power connector 210 relative to the panel 106. The locating features 266 may limit over deflection of the mounting springs 250, 252, 254.

Figure 4:
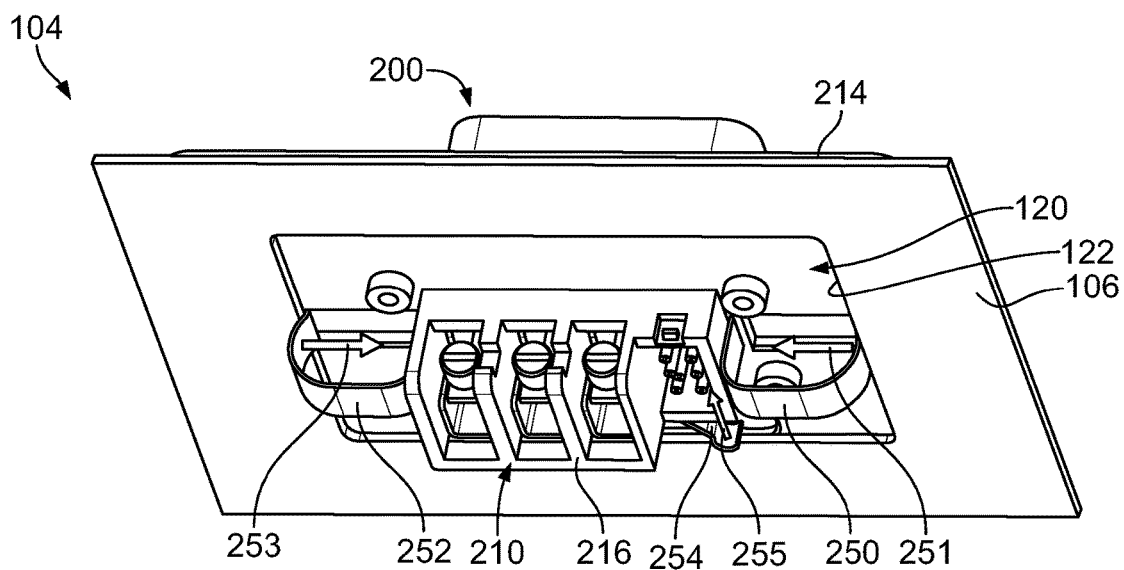
FIG. 4 is a rear perspective view of the charging component showing a portion of the supply charging device mated to the panel in accordance with an exemplary embodiment.
Figure 5:
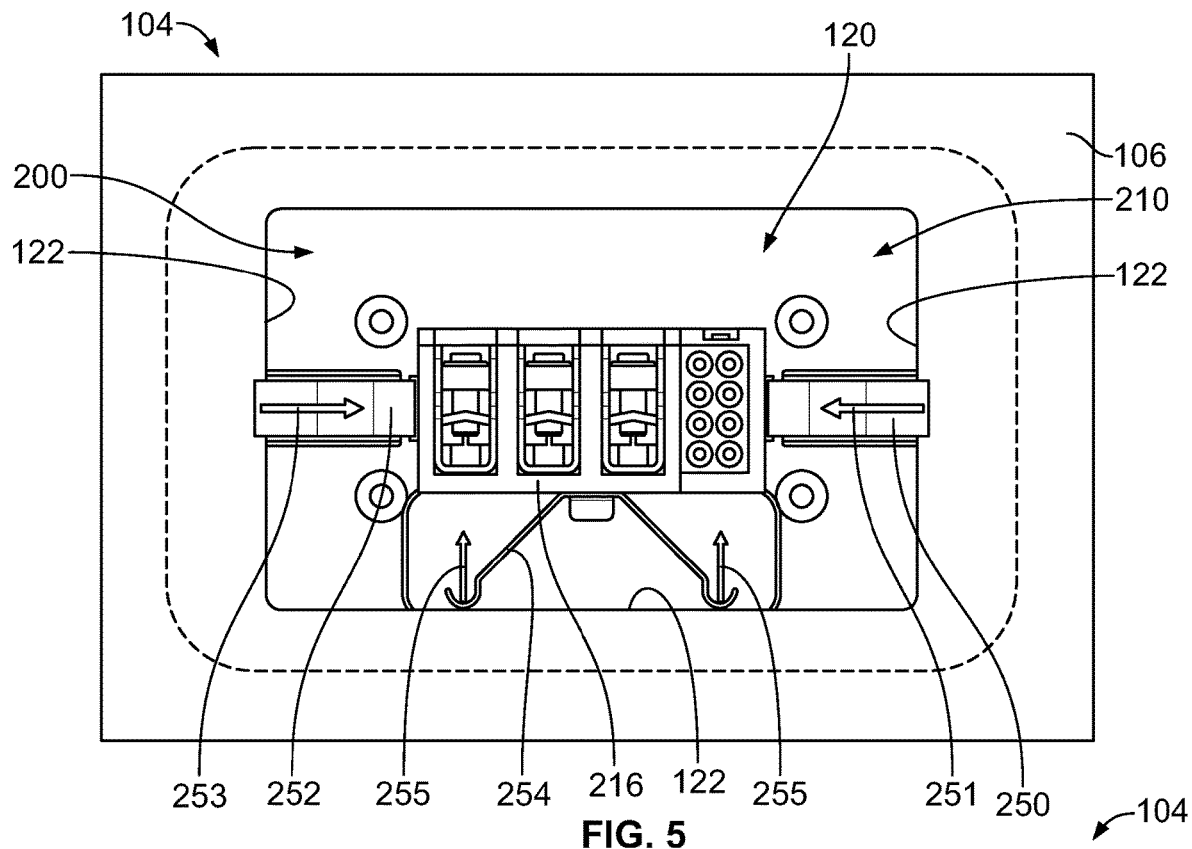
FIG. 5 is a rear view of the charging component showing a portion of the supply charging device mated to the panel in accordance with an exemplary embodiment.

FIG. 4 is a rear perspective view of the charging component 104 showing a portion of the supply charging device 200 mated to the panel 106. FIG. 5 is a rear view of the charging component 104 showing a portion of the supply charging device 200 mated to the panel 106. The supply flange 214 is located forward of the panel 106. The supply base 216 extends into and through the panel cutout 120 to the interior of the charging component 104. The mounting springs 250, 252, 254 extend into the panel cutout 120 and engage the panel 106. For example, the mounting spring 250 engages a right edge 122 of the panel cutout 120, the mounting spring 252 engages a left edge 122 of the panel cutout 120 and the mounting spring 254 engages a bottom edge 122 of the panel cutout 120.

The mounting springs 250, 252, 254 bias the supply power connector 210 to a resting position relative to the panel 106. For example, the supply base 216 may be approximately centered within the panel cutout 120 in the resting position. The supply power connector 210 is movable from the resting position to an offset position (for example, movable to the right side, to the left side, upward, and/or downward), such as when the mobile charging device 300 (shown in FIG. 2) engages the supply charging device 200 to align the supply charging device 200 with the mobile charging device 300. The mounting spring 250, the mounting spring 252, and/or the mounting spring 254 may be compressed when the supply power connector 210 moves to the offset position. The mounting springs 250, 252, 254 return the supply power connector 210 from the offset position to the resting position when the supply power connector 210 is released.

When the mounting spring 250 is compressed, the mounting spring 250 biases the supply power connector 210 in a first direction 251 relative to the panel 106. Similarly, when the mounting spring 252 is compressed, the mounting spring 252 biases the supply power connector 210 in a second direction 253 relative to the panel 106. When the mounting spring 254 is compressed, the mounting spring 254 biases the supply power connector 210 in a third direction 255 relative to the panel 106. In the illustrated embodiment, the first direction 251 and the second direction 253 are parallel to each other in opposing directions. In the illustrated embodiment, the third direction 255 is perpendicular to the first and second directions 251, 253.

The mounting springs 250, 252 control horizontal positioning (for example, side-to-side) of the supply charging device 200 relative to the panel 106. The widths of the mounting springs 250, 252 control the amount of horizontal offset or float allowed by the supply charging device 200 within the panel cutout 120. The mounting spring 254 controls vertical positioning (for example, up and down) of the supply charging device 200 relative to the panel 106. The height of the mounting spring 254 controls the amount of vertical offset or float allowed by the supply charging device 200 within the panel cutout 120.

Figure 6:
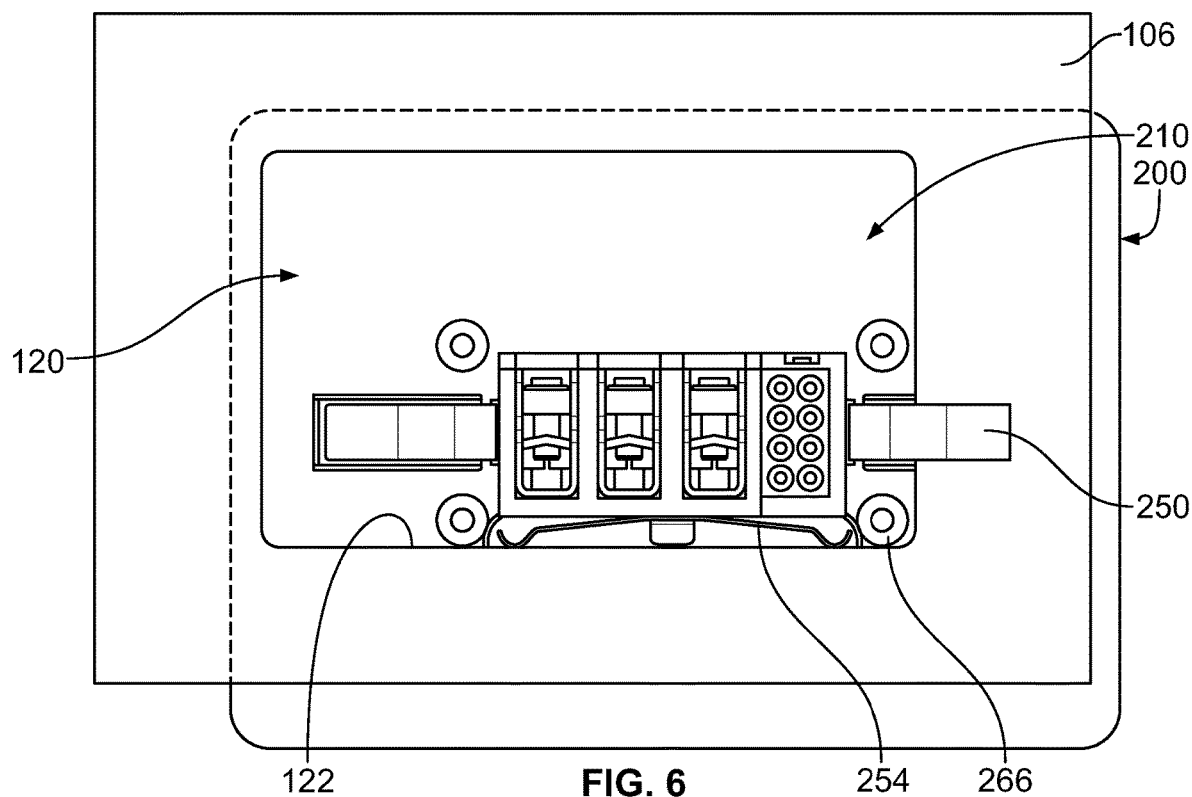
FIG. 6 is a rear view of the charging component showing the supply charging device in an offset position relative to the panel in accordance with an exemplary embodiment.

FIG. 6 is a rear view of the charging component 104 showing the supply charging device 200 in an offset position relative to the panel 106. FIG. 6 illustrates the supply power connector 210 shifted downward and shifted to the right relative to the panel 106. In such position, the mounting spring 250 is compressed and the mounting spring 254 is compressed. The locating features 266 engage the edges 122 of the panel cutout 120 to limit movement of the supply power connector 210 relative to the panel 106. When the supply power connector 210 is released, the mounting springs 250, 254 are configured to return the supply power connector 210 to the resting position (shown in FIG. 5).

Figure 7:
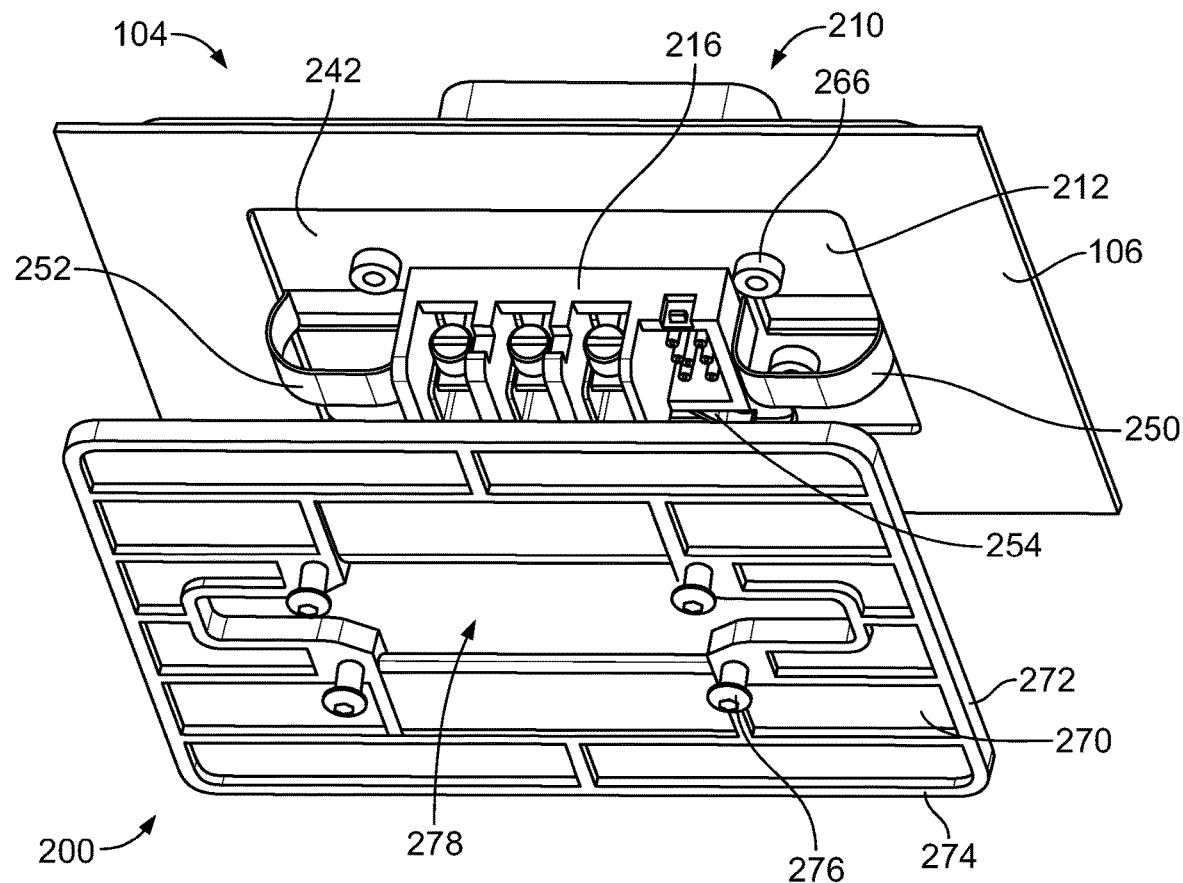
FIG. 7 is a rear perspective view of the charging component showing a portion of the supply charging device mounted to the panel in accordance with an exemplary embodiment.

FIG. 7 is a rear perspective view of the charging component 104 showing a portion of the supply charging device 200 mounted to the panel 106. The supply charging device 200 includes a retaining plate 270 coupled to the rear 242 of the supply housing 212. The retaining plate 270 is used to mount the supply power connector 210 to the panel 106. The retaining plate 270 includes a front 272 and a rear 274. The front 272 faces the panel 106. Fasteners 276 are used to secure the retaining plate 270 to the supply housing 212. Optionally, the fasteners 276 may be secured to the locating features 266. The retaining plate 270 includes an opening 278 configured to receive the supply base 216. The opening 278 may receive portions of the mounting springs 250, 252. The opening 278 may receive portions of the mounting spring 254 in various embodiments.

Figure 8:
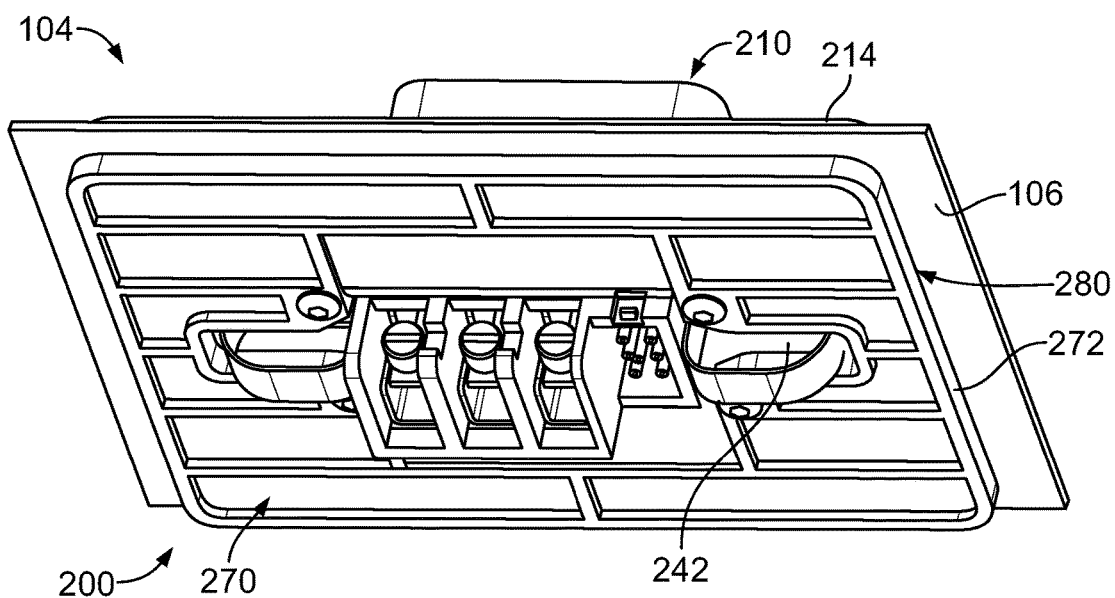
FIG. 8 is a rear perspective view of the charging component showing the supply charging device mounted to the panel in accordance with an exemplary embodiment.

FIG. 8 is a rear perspective view of the charging component 104 showing the supply charging device 200 mounted to the panel 106. The panel 106 is captured in a panel gap 280 between the front 272 of the retaining plate 270 and the rear 242 of the supply flange 214. The retaining plate 270 is coupled to the supply power connector 210 such that the retaining plate 270 is movable relative to the panel 106 with the supply power connector 210.

Figure 9:
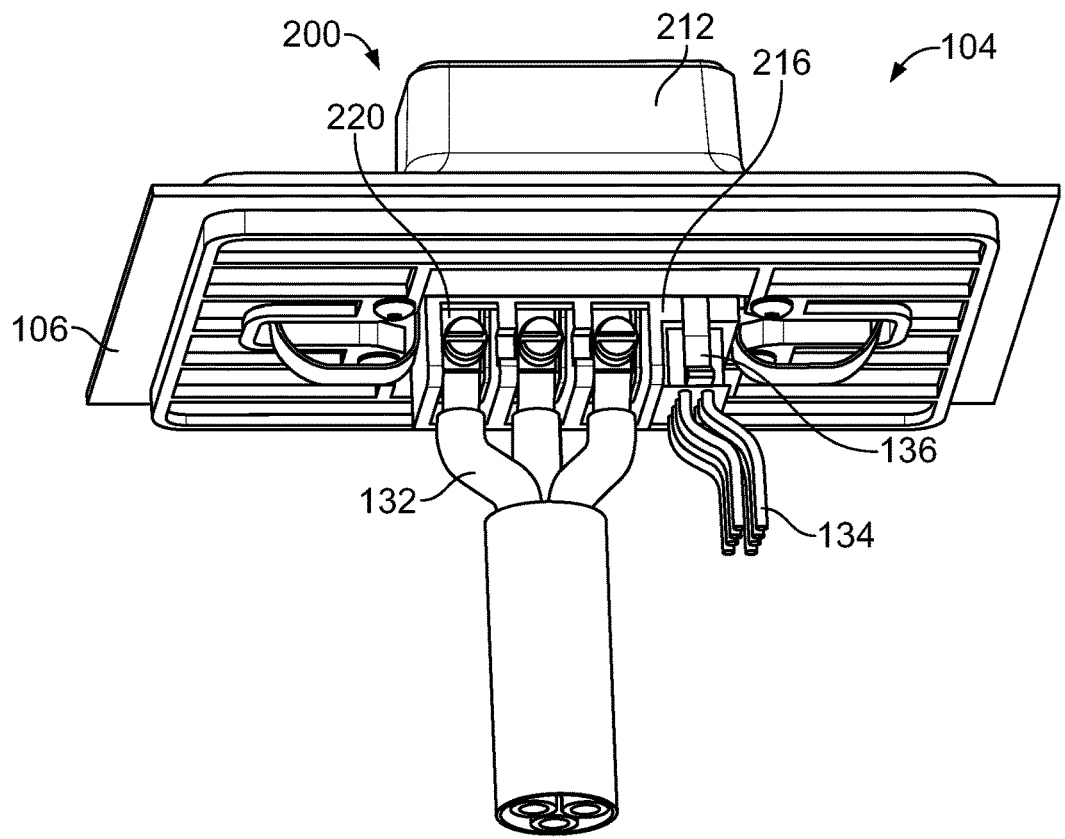
FIG. 9 is a rear perspective view of the charging component showing the supply charging device mounted to the panel in accordance with an exemplary embodiment.

FIG. 9 is a rear perspective view of the charging component 104 showing the supply charging device 200 mounted to the panel 106. Power wires 132 are terminated to the supply power contacts 220. Signal wires 134 are terminated to the supply signal contacts 224 (shown in FIG. 2). In the illustrated embodiment, the signal wires 134 extend from a connector housing 136 coupled to the supply base 216. Optionally, the supply signal contacts 224 may be integrated into the connector housing 136 and terminated to the signal wires 134. The supply signal contacts 224 are loaded into the supply housing 212 when the connector housing 136 is coupled to the supply housing 212.

Figure 10:
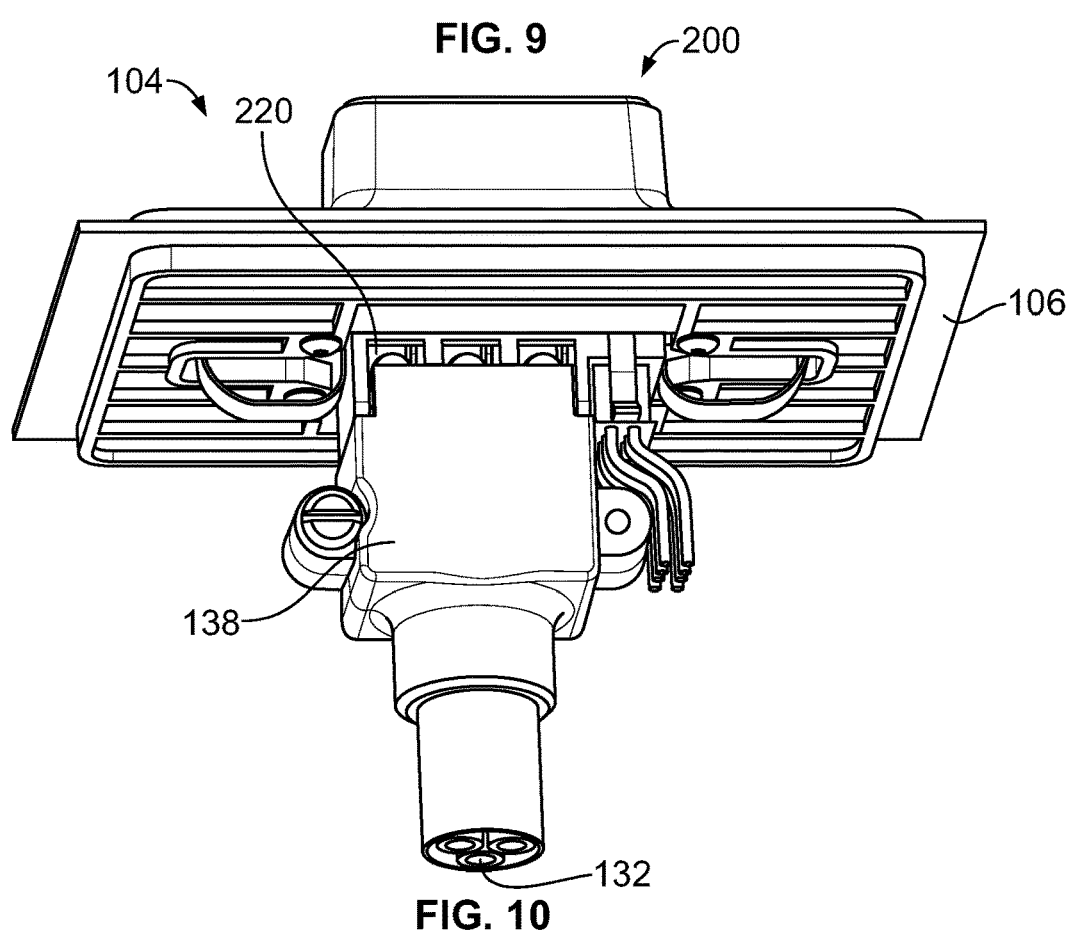
FIG. 10 is a rear perspective view of the charging component showing the supply charging device mounted to the panel in accordance with an exemplary embodiment.

FIG. 10 is a rear perspective view of the charging component 104 showing the supply charging device 200 mounted to the panel 106. A wire housing 138 is shown in FIG. 10 surrounding the power wires 132. The wire housing 138 may restrict access to the terminating ends of the power wires 132. The wire housing 138 may provide strain relief for the power wires 132. In other various embodiments, the wire housing 138 may hold power terminals configured to be mated to the supply power contacts 220, such as at a pluggable interface.

Figure 11:
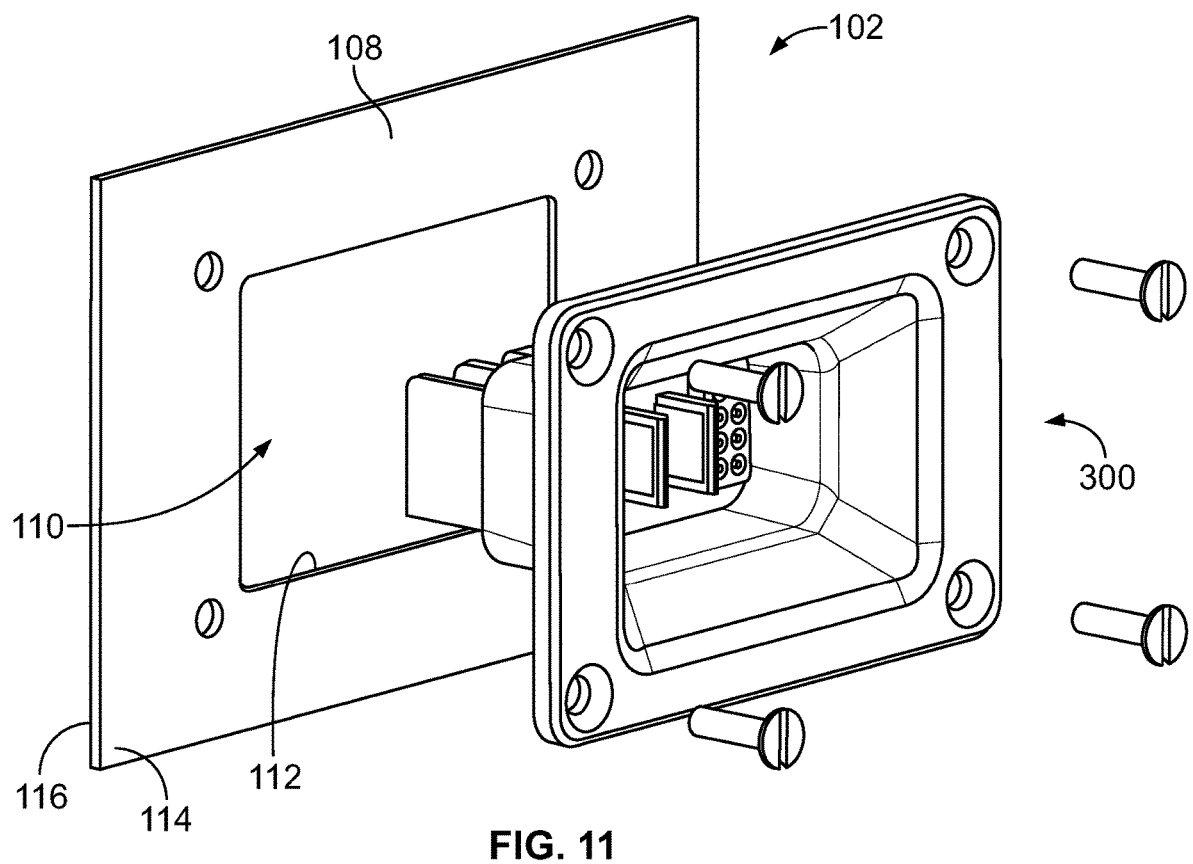
FIG. 11 is a front perspective view of a portion of the mobile device showing the mobile charging device positioned for mounting to the body in accordance with an exemplary embodiment.

FIG. 11 is a front perspective view of a portion of the mobile device 102 showing the mobile charging device 300 positioned for mounting to the body 108. The body 108 includes a body cutout 110 configured to receive the mobile charging device 300. The body cutout 110 is defined by edges 112 extending between a front 114 and a rear 116 of the body 108. The front 114 faces an exterior of the mobile device 102 and the rear 116 faces an interior of the mobile device 102.

Figure 12:
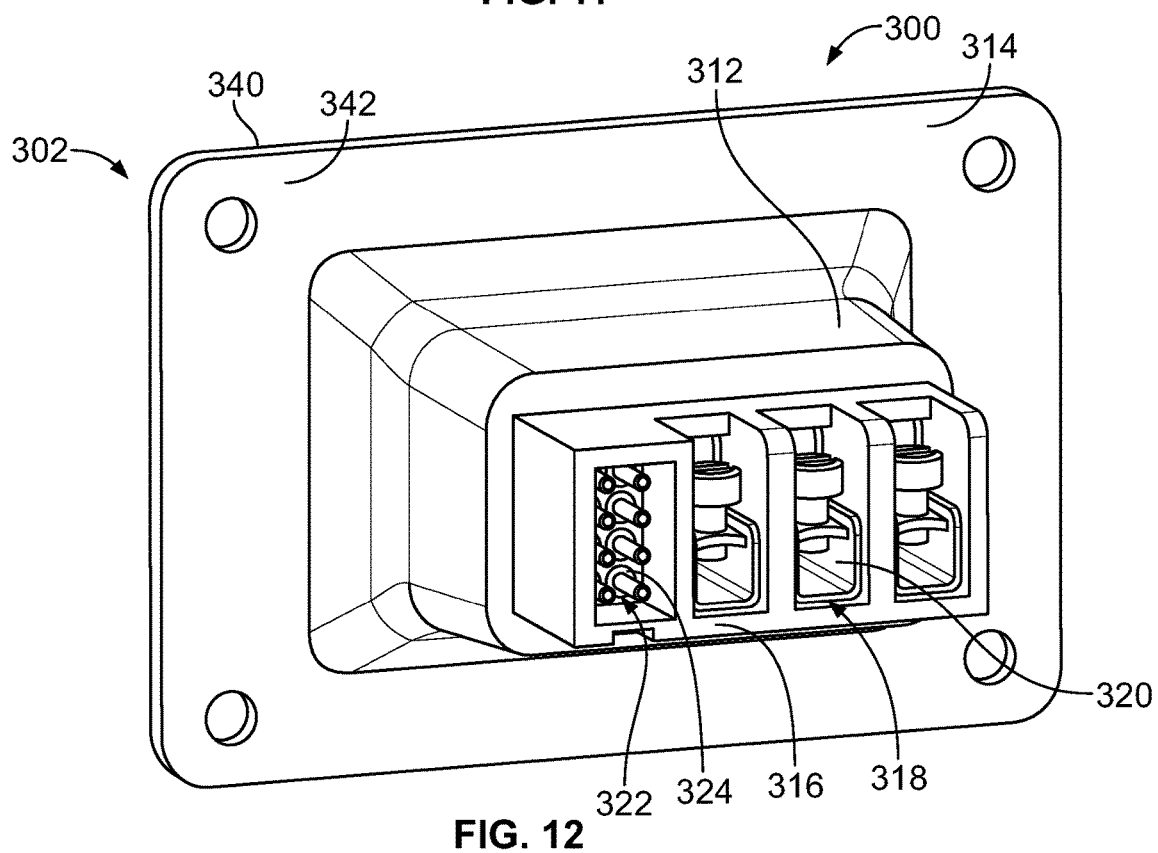
FIG. 12 is a rear perspective view of the mobile charging device in accordance with an exemplary embodiment.

FIG. 12 is a rear perspective view of the mobile charging device 300 in accordance with an exemplary embodiment. The receiver housing 312 extends between a front 340 and a rear 342. The mating end 302 is provided at the front 340 of the receiver housing 312. The receiver base 316 extends rearward from the receiver flange 314 to the rear 342 of the receiver housing 312. The receiver power contact channels 318 and the receiver signal contact channels 322 extend through the receiver base 316. The receiver power contacts 320 are located in the receiver base 316 and/or extend rearward from the receiver base 316 for termination to power wires or a power connector. In the illustrated embodiment, the receiver power contacts 320 include wire clamps configured to receive power wires. Other types of terminations may be provided in alternative embodiments, such as crimped contacts, insulation displacement contacts, pin contacts, socket contacts, solder contacts, surface mount contacts, and the like. The supply housing 312 includes separating walls between the receiver power contacts 320 to electrically isolate the receiver power contacts 320, such as to prevent electrical arcing. The supply housing 312 includes separating walls between the receiver power contact 320 and the receiver signal contacts 324 to electrically isolate the receiver power contacts 320 from the receiver signal contacts 324. The receiver signal contacts 324 are located in the receiver base 316 and/or extend rearward from the receiver base 316 for termination to signal wires or a signal connector. The receiver signal contacts 324 are configured to be coupled to signal wires.

Figure 13:
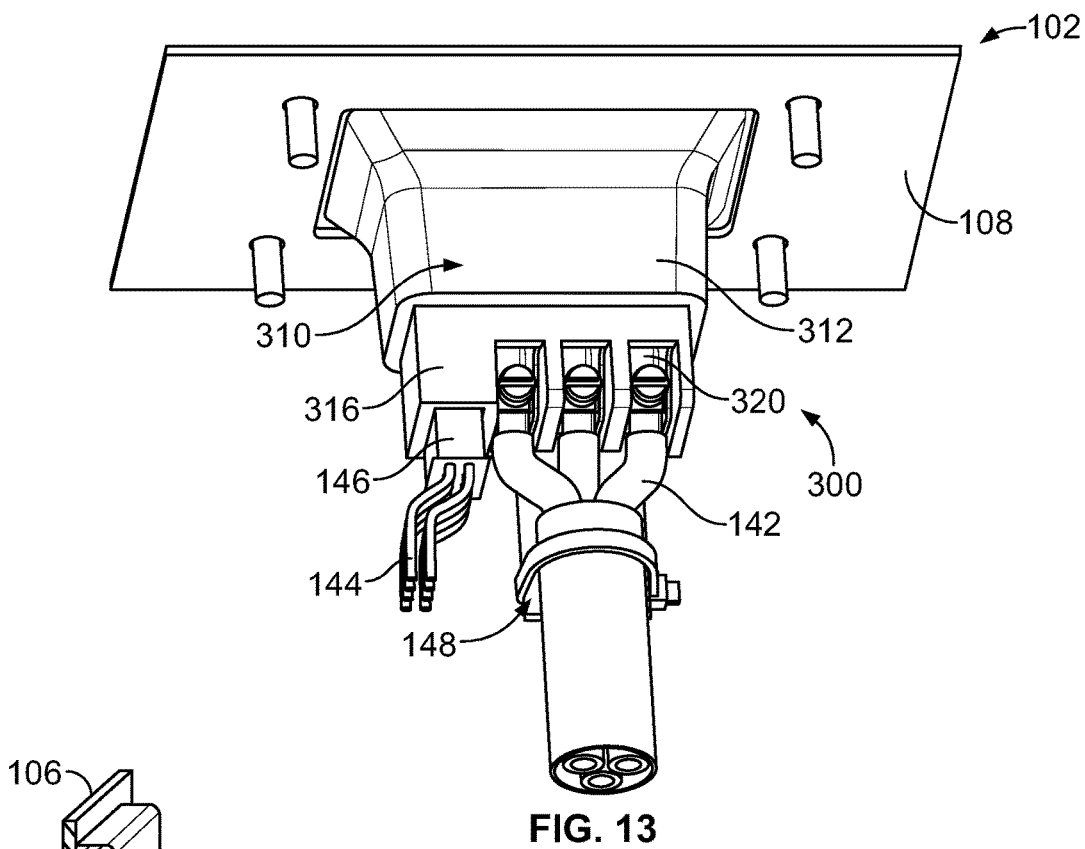
FIG. 13 is a rear perspective view of the mobile device showing the receiver charging device mounted to the body in accordance with an exemplary embodiment.

FIG. 13 is a rear perspective view of the mobile device 102 showing the mobile charging device 300 mounted to the body 108. Power wires 142 are terminated to the receiver power contacts 320. Signal wires 144 are configured to be electrically connected to the receiver signal contacts 324 (shown in FIG. 3). In the illustrated embodiment, the signal wires 144 extend from a connector housing 146 coupled to the receiver base 316. Optionally, the receiver signal contacts 324 may be integrated into the connector housing 146 and terminated to the signal wires 144. The receiver signal contacts 324 are loaded into the receiver housing 312 when the connector housing 146 is coupled to the receiver housing 312. In an exemplary embodiment, the receiver power connector 310 includes a strain relief component 148 to provide strain relief for the receiver power wires 142. In the illustrated embodiment, the strain relief component 148 includes a support tab and a wire tie securing the power wires 142 to the support tab. Other types of strain relief components may be used in alternative embodiments.

Figure 14:
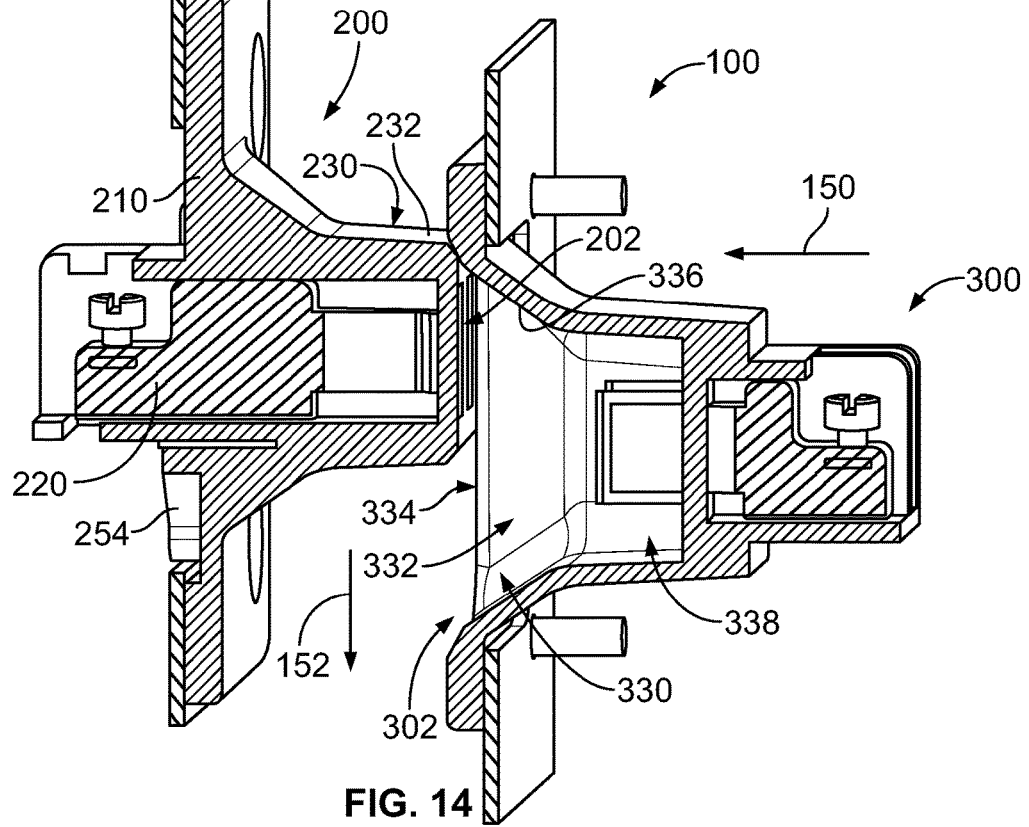
FIG. 14 is a cross-sectional view of the charging system in accordance with an exemplary embodiment showing the mobile charging device being mated with the supply charging device in a mating direction.

FIG. 14 is a cross-sectional view of the charging system 100 in accordance with an exemplary embodiment showing the mobile charging device 300 being mated with the supply charging device 200 in a mating direction 150. The mobile charging device 300 is offset or misaligned relative to the supply charging device 200. For example, in the illustrated embodiment, the mobile charging device 300 is offset lower than the supply charging device 200. FIGS. 16-19 illustrate other examples of misaligned mating between the mobile charging device 300 and the supply charging device 200. The supply charging device 200 is movable relative to the panel 106 to align the mating end 202 of the supply charging device 200 with the mating end 302 of the mobile charging device 300. The guide member 230 engages the guide features 330 to align the mating ends 202, 302.

During mating, the nose 232 is received in the funnel 332 through the opening 334. As the mobile charging device 300 moves in the mating direction 150, the guide walls 336 engage the guide member 230 and forced the guide member 230 in an offsetting direction 152. In the illustrated embodiment, the offsetting direction 152 is in a downward direction; however, the offsetting direction 152 may be in a different direction in alternative embodiments, including an upward direction and/or a sideways direction. The mounting spring 254 is compressed as the supply power connector 210 is shifted in the offsetting direction 152. The supply power connector 210 is shifted relative to the panel 106 to align the nose 232 with the receptacle 338. The nose 232 rides along the guide wall 336 and is received in the receptacle 338 as the mobile charging device 300 is moved in the mating direction 150. The supply power contacts 220 are mated with the receiver power contacts 320 as the mobile charging device 300 is moved in the mating direction 150.

Figure 15:
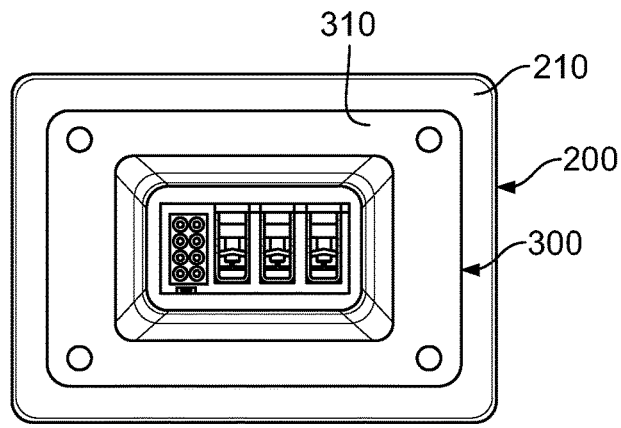
FIG. 15 illustrates the mobile charging device aligned with the supply charging device in accordance with an exemplary embodiment.

FIGS. 15-19 illustrate examples of mating scenarios between the mobile charging device 300 and the supply charging device 200. FIG. 15 illustrates the mobile charging device 300 aligned with the supply charging device 200. When aligned, the supply charging device 200 is not required to move in any direction to mate the receiver power connector 310 with the supply power connector 210.

Figure 16:
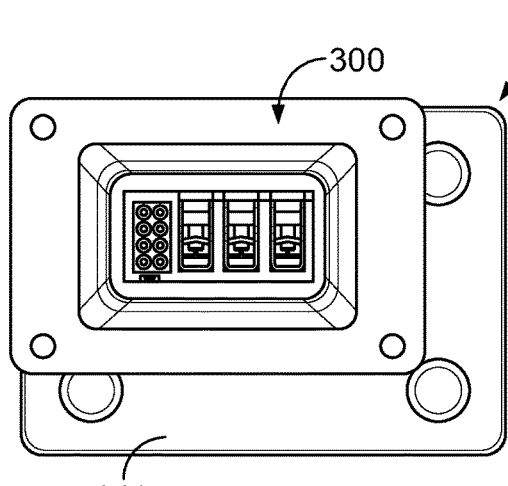
FIG. 16 illustrates the mobile charging device misaligned in an upper left offset position relative to the supply charging device in accordance with an exemplary embodiment.

FIG. 16 illustrates the mobile charging device 300 misaligned in an upper left offset position relative to the supply charging device 200. The supply power connector 210 is required to be shifted relative to the panel 106 (shown in FIG. 14) upward and to the left for proper mating with the supply charging device 200.

Figure 17:
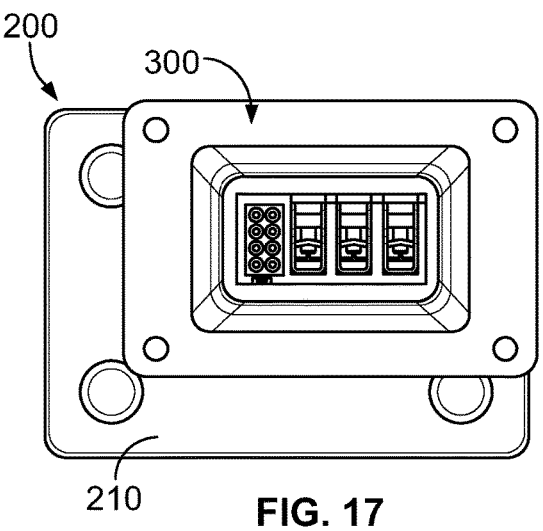
FIG. 17 illustrates the mobile charging device misaligned in an upper right offset position relative to the supply charging device in accordance with an exemplary embodiment.

FIG. 17 illustrates the mobile charging device 300 misaligned in an upper right offset position relative to the supply charging device 200. The supply power connector 210 is required to be shifted relative to the panel 106 (shown in FIG. 14) upward and to the right for proper mating with the supply charging device 200.

Figure 18:
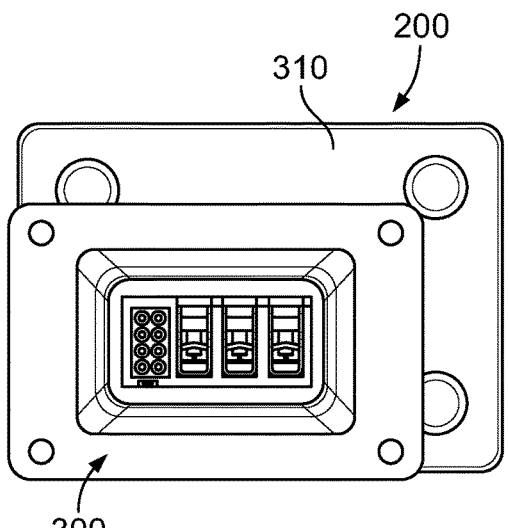
FIG. 18 illustrates the mobile charging device misaligned in a lower left offset position relative to the supply charging device in accordance with an exemplary embodiment.

FIG. 18 illustrates the mobile charging device 300 misaligned in a lower left offset position relative to the supply charging device 200. The supply power connector 210 is required to be shifted relative to the panel 106 (shown in FIG. 14) downward and to the left for proper mating with the supply charging device 200.

Figure 19:
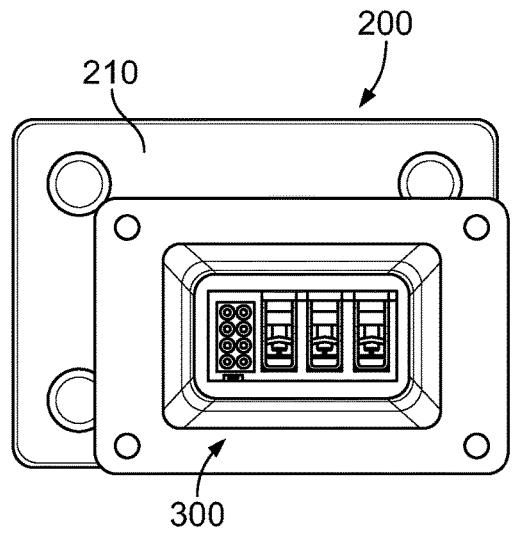
FIG. 19 illustrates the mobile charging device misaligned in a lower right offset position relative to the supply charging device in accordance with an exemplary embodiment.

FIG. 19 illustrates the mobile charging device 300 misaligned in a lower right offset position relative to the supply charging device 200. The supply power connector 210 is required to be shifted relative to the panel 106 (shown in FIG. 14) downward and to the right for proper mating with the supply charging device 200.

Figure 20:
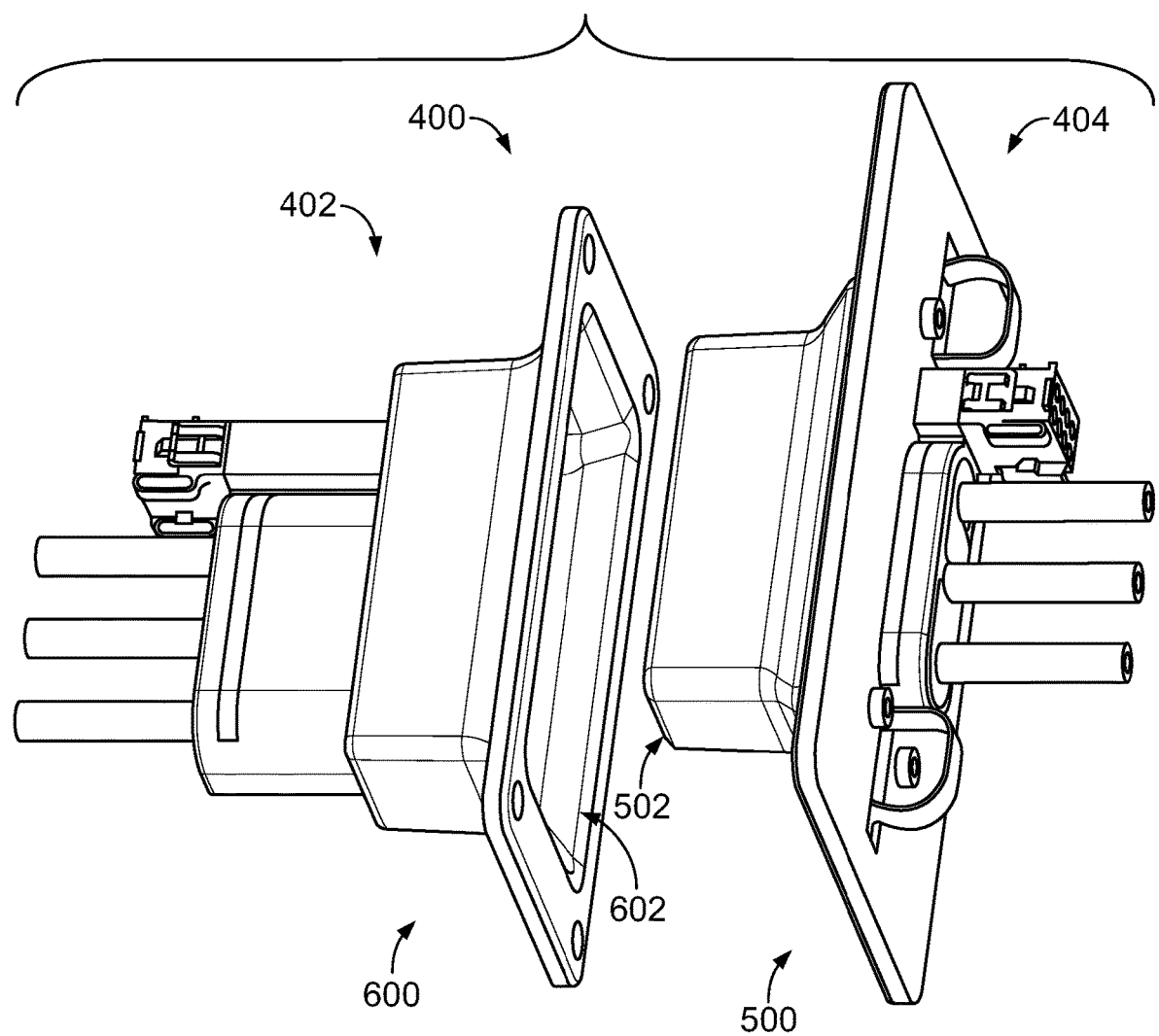
FIG. 20 illustrates a charging system in accordance with an exemplary embodiment including a supply charging device and a mobile charging device in accordance with an exemplary embodiment.
Figure 21:
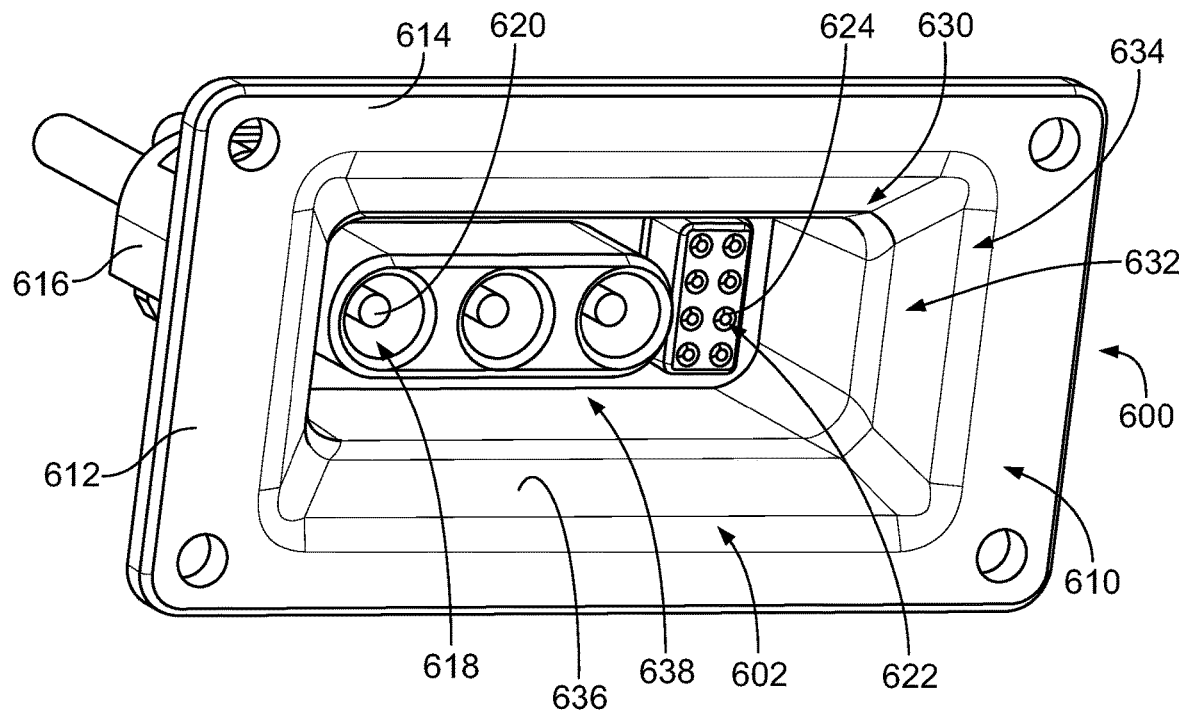
FIG. 21 is a front perspective view of the mobile charging device in accordance with an exemplary embodiment.
Figure 22:
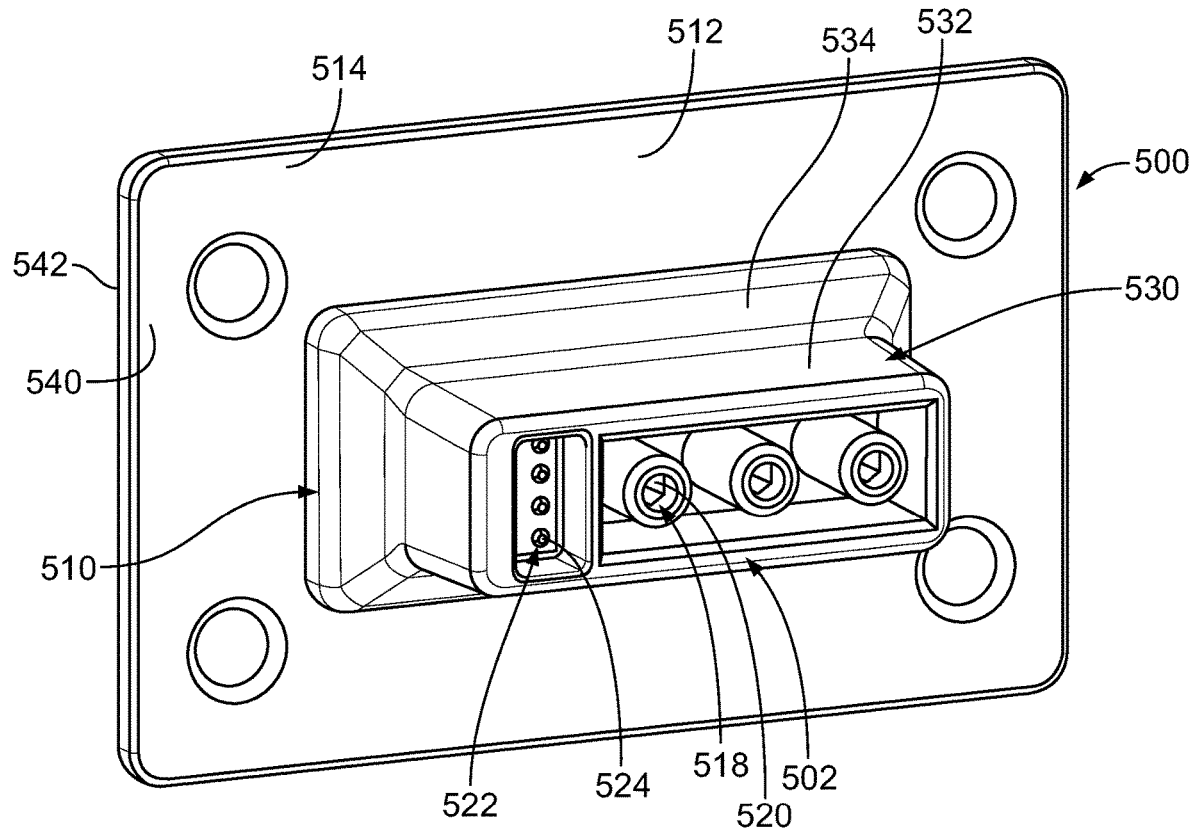
FIG. 22 is a front perspective view of the supply charging device in accordance with an exemplary embodiment.

FIG. 20 illustrates a charging system 400 in accordance with an exemplary embodiment including a supply charging device 500 and a mobile charging device 600. FIG. 21 is a front perspective view of the mobile charging device 600 in accordance with an exemplary embodiment. FIG. 22 is a front perspective view of the supply charging device 500 in accordance with an exemplary embodiment. The charging system 400 is similar to the charging system 100 (shown in FIG. 2); however, the charging system 400 includes different types of power contacts and signal contacts.

The mobile charging device 600 is provided on a mobile device 402 and includes a mating end 602 configured to be mated with the supply charging device 500. The supply charging device 500 is provided on a charging component 404 and includes a mating end 502 configured to be mated with the mobile charging device 600. The supply charging device 500 is configured to be coupled to a panel, such as the panel 106 (shown in FIG. 2). The mobile charging device 600 is configured to be coupled to a body of a mobile device, such as the body 108. The mobile device 402 is configured to be separated from the charging component 404 and returned to the charging component 404 to recharge the mobile device 402. The mobile charging device 600 receives power from the supply charging device 500 when coupled thereto.

With reference to FIG. 21, the mobile charging device 600 includes a receiver power connector 610 having a receiver housing 612. The receiver housing 612 has a receiver flange 614 configured to be mounted to the body 108 of the mobile device 402. The receiver housing 612 has a receiver base 616 including receiver power contact channels 618 that hold receiver power contacts 620. In the illustrated embodiment, the receiver power contacts 620 are illustrated as blade contacts; however, other types of power contacts may be used in alternative embodiments, such as pins, sockets, spring beams, and the like. The receiver housing 612 includes receiver signal contact channels 622 that hold receiver signal contacts 624.

The receiver housing 612 includes a guide feature 630 to guide mating of the mobile charging device 600 with the supply charging device 500. In an exemplary embodiment, the guide feature 630 includes a funnel 632 having an opening 634. The funnel 632 has angled guide walls 636 between the opening 634 and a receptacle 638 at the receiver base 616. The receiver power contacts 620 extend into the receptacle 638 for mating with the supply charging device 500. The guide walls 636 guide alignment of the supply charging device 500 and the mobile charging device 600 with the mobile device 402 returns to the charging component 404. The funnel 632 accommodates horizontal misalignment (for example, misalignment from either side) and accommodates vertical misalignment (for example, misalignment from above or from below).

With reference to FIG. 22, the supply charging device 500 includes a supply power connector 510 having a supply housing 512. The supply housing 512 extends between a front 540 and a rear 542. The mating end 502 is provided at the front 540 of the supply housing 512. The supply housing 512 has a supply flange 514 configured to be mounted to the panel 106. The supply housing 512 includes supply power contact channels 518 that receive supply power contacts 520. The supply housing 512 includes supply signal contact channels 522 that receive supply signal contacts 524. In the illustrated embodiment, the supply power contacts 520 are illustrated as spring beam contacts; however, other types of power contacts may be used in alternative embodiments, such as pins, sockets, blades, spring beams, and the like. The supply power contact 520 and the supply signal contact 524 are configured to be electrically connected to the receiver power contacts 620 and the receiver signal contacts 624 when the mobile charging device 600 is mated with the supply charging device 500.

The supply housing 512 includes a guide member 530 extending forward from the flange 514. The guide member 530 is configured to be received in the funnel 632 of the receiver housing 612 through the opening 634 to locate the supply charging device 500 relative to the mobile charging device 600. In an exemplary embodiment, the guide member 530 includes a nose 532 and a cone 534 extending between the nose 532 and the flange 514. The nose 532 is configured to be received in the receptacle 638.

Figure 23:
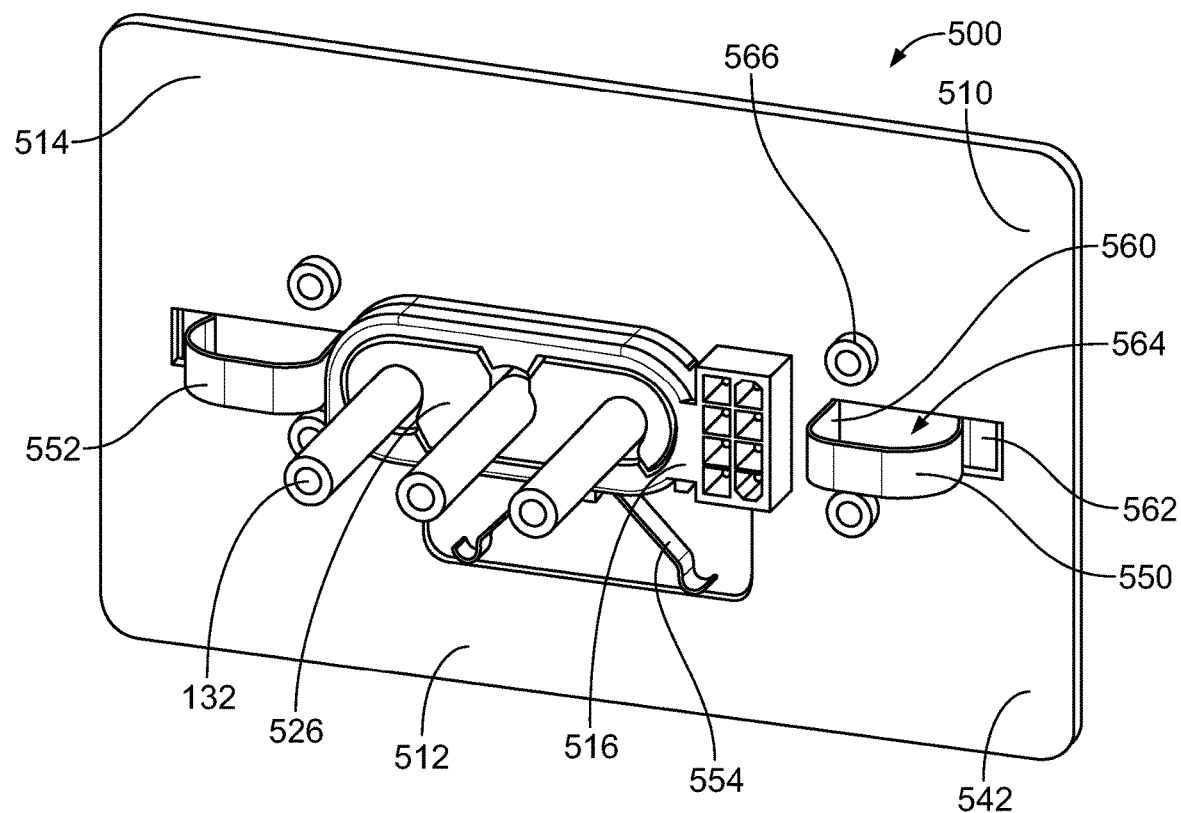
FIG. 23 is a rear perspective view of the supply charging device in accordance with an exemplary embodiment.

FIG. 23 is a rear perspective view of the supply charging device 500 in accordance with an exemplary embodiment. The supply housing 512 includes a supply base 516 extending rearward from the supply flange 514 to the rear 542 of the supply housing 512. The supply base 516 receives a contact holder 526 that holds the supply power contacts 520 (shown in FIG. 22). The power wires 132 extend from the contact holder 526.

In an exemplary embodiment, the supply charging device 500 includes mounting springs 550, 552, 554 coupled to the supply housing 512 at the rear 542 of the supply housing 512. The mounting springs 550, 552, 554 are configured to engage the panel 106 to allow the supply power connector 510 to float relative to the panel 106 for alignment of the mating end 502 of the supply power connector 510 with the receiver power connector 610 (shown in FIG. 21). The mounting springs 550, 552, 554 are compressible to allow the supply housing 512 to move relative to the panel 106 to change a position of the mating end 502 of the supply power connector 510 relative to the panel 106 for mating with the receiver power connector 610.

The mounting spring 550 includes a fixed end 560 coupled to the supply housing 512 and a free end 562 configured to be coupled to the panel 106. The mounting spring 550 is compressible such that the free end 562 is movable relative to the fixed end 560. In an exemplary embodiment, the supply housing 512 includes a slot 564 at the rear 542 that receives the free end 562 of the mounting spring 550.

In an exemplary embodiment, the supply housing 512 includes locating features 566 extending from the supply flange 514 at the rear 542. In the illustrated embodiment, the locating features 566 are cylindrical posts. Other types of locating features may be used in alternative embodiments. The locating features 566 may be provided on the supply base 516 in alternative embodiments. The locating features 566 are configured be engage the panel 106 to locate the supply power connector 510 relative to the panel 106.

Figure 24:
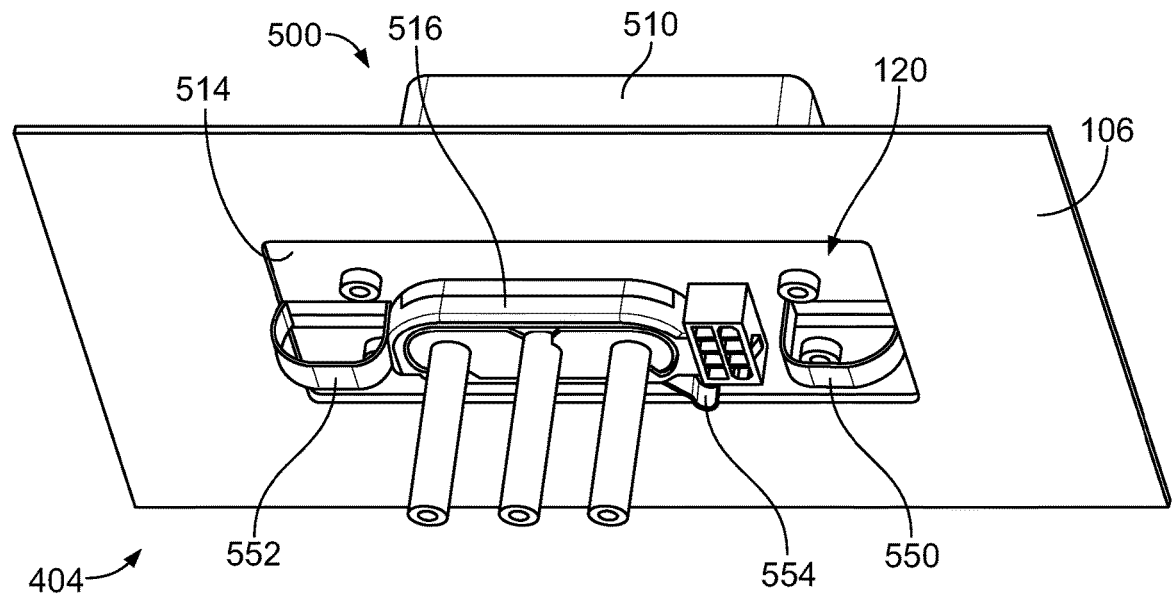
FIG. 24 is a rear perspective view of the supply charging device mated to the panel in accordance with an exemplary embodiment.

FIG. 24 is a rear perspective view of the supply charging device 500 mated to the panel 106. The supply flange 514 is located forward of the panel 106. The supply base 516 extends into and through the panel cutout 120 to the interior of the charging component 404. The mounting springs 550, 552, 554 extend into the panel cutout 120 and engage the panel 106. The mounting springs 550, 552, 554 bias the supply power connector 510 to a resting position relative to the panel 106.

The supply power connector 510 is movable from the resting position to an offset position (for example, movable to the right side, to the left side, upward, and/or downward), such as when the mobile charging device 600 (shown in FIG. 21) engages the supply charging device 500 to align the supply charging device 500 with the mobile charging device 600. The mounting springs 550, 552, 554 return the supply power connector 510 from the offset position to the resting position when the supply power connector 510 is released. The mounting springs 550, 552 control horizontal positioning (for example, side-to-side) of the supply charging device 500 relative to the panel 106. The mounting spring 554 controls vertical positioning (for example, up and down) of the supply charging device 500 relative to the panel 106.

Figure 25:
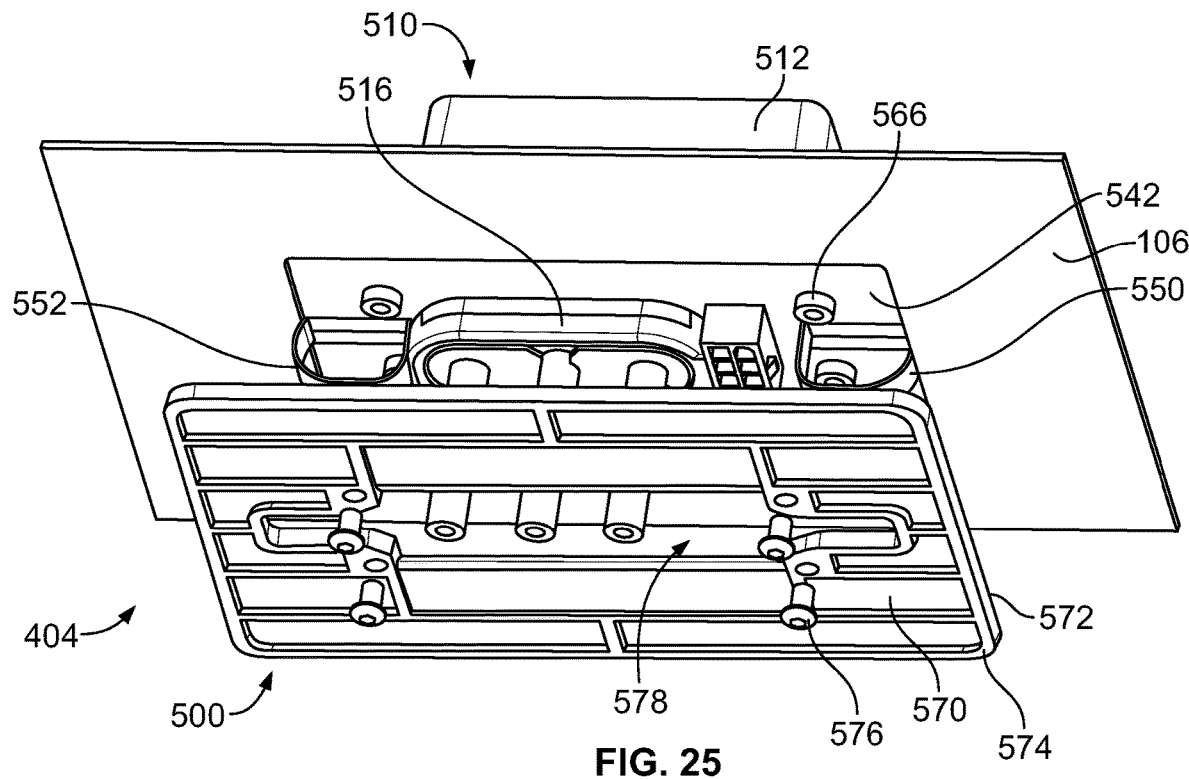
FIG. 25 is a rear perspective view of the charging component showing a portion of the supply charging device mounted to the panel in accordance with an exemplary embodiment.

FIG. 25 is a rear perspective view of the charging component 404 showing a portion of the supply charging device 500 mounted to the panel 106. The supply charging device 500 includes a retaining plate 570 coupled to the rear 542 of the supply housing 512. The retaining plate 570 is used to mount the supply power connector 510 to the panel 106. The retaining plate 570 includes a front 572 and a rear 574. The front 572 faces the panel 106. Fasteners 576 are used to secure the retaining plate 570 to the supply housing 512. Optionally, the fasteners 576 may be secured to the locating features 566. The retaining plate 570 includes an opening 578 configured to receive the supply base 516. The opening 578 may receive portions of the mounting springs 550, 552. The opening 578 may receive portions of the mounting spring 554 in various embodiments.

Figure 26:
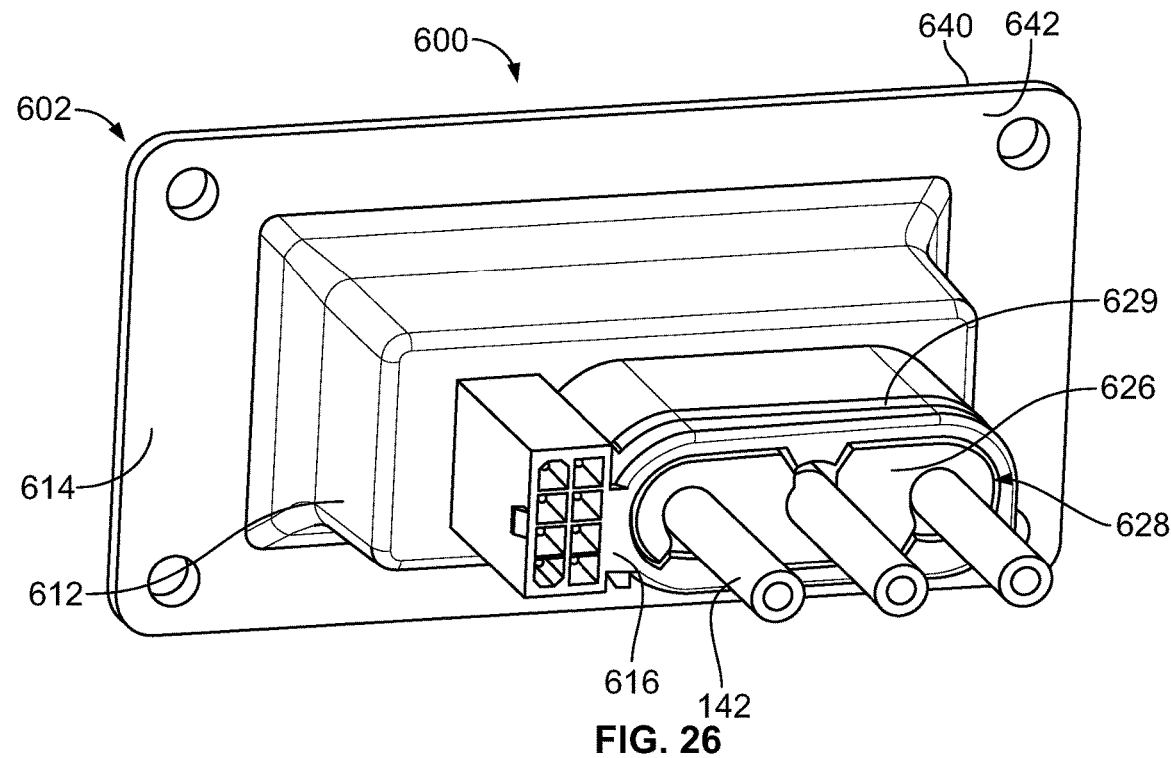
FIG. 26 is a rear perspective view of the mobile charging device in accordance with an exemplary embodiment.
Figure 27:
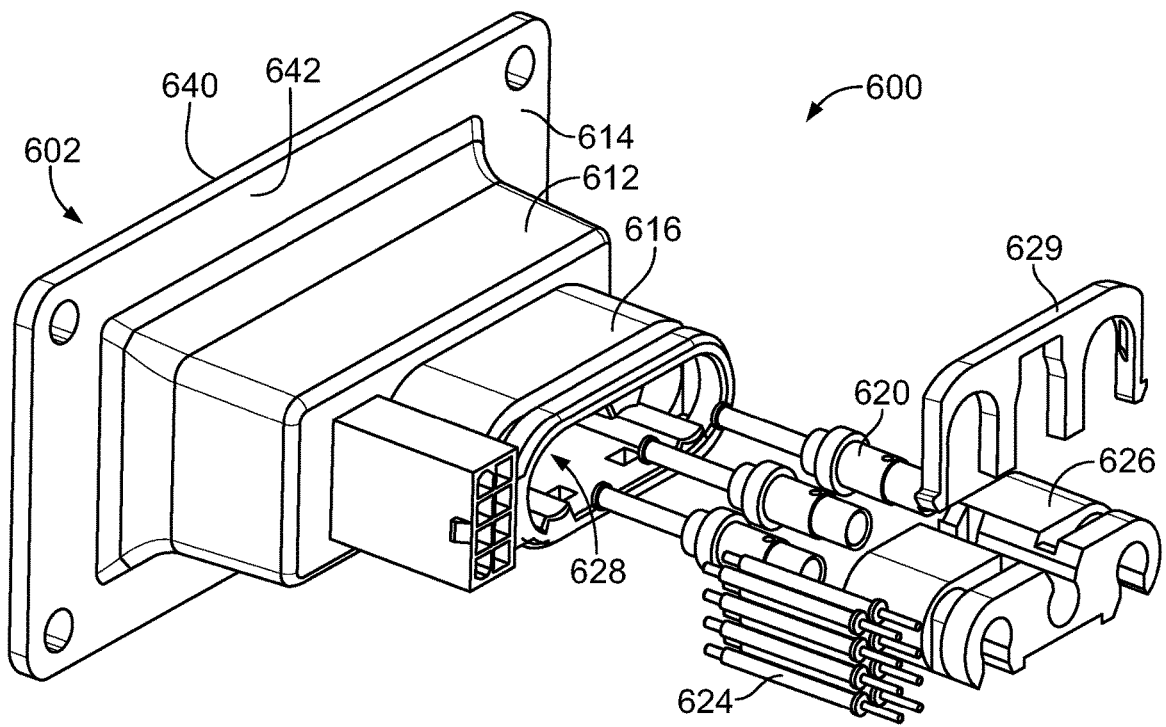
FIG. 27 is a rear perspective, exploded view of the mobile charging device in accordance with an exemplary embodiment.

FIG. 26 is a rear perspective view of the mobile charging device 600 in accordance with an exemplary embodiment. FIG. 27 is a rear perspective, exploded view of the mobile charging device 600 in accordance with an exemplary embodiment. The receiver housing 612 extends between a front 640 and a rear 642. The mating end 602 is provided at the front 640 of the receiver housing 612. The receiver base 616 extends rearward from the receiver flange 614 to the rear 642 of the receiver housing 612. In the illustrated embodiment, the receiver signal contacts 624 are pogo contacts; however, other types of contact may be used in alternative embodiments.

The receiver base 616 receives a contact holder 626 in a cavity 628 of the receiver base 616. The contact holder 626 holds the receiver power contacts 620 (FIG. 27). The power wires 142 extend from the contact holder 626. In the illustrated embodiment, the receiver power contacts 620 are configured be side loaded into corresponding contact channels in the contact holder 626, such as through the top side and/or the bottom side of the contact holder 626. In alternative embodiments, the receiver power contacts 620 may be end loaded into the contact holder 626, such as through the rear end of the contact holder 626. In an exemplary embodiment, a contact lock 629 is used to lock the receiver power contacts 620 in the contact holder 626. The contact holder 626, with the receiver power contacts 620 loaded therein and the power wires 142 extending therefrom, is configured to be rear loaded into the cavity 628 of the receiver base 616. The contact lock 629 is then coupled to the receiver base 616 to lock the contact holder 626 in the cavity 628 and to lock the receiver power contacts 620 in the contact holder 626.

Figure 28:
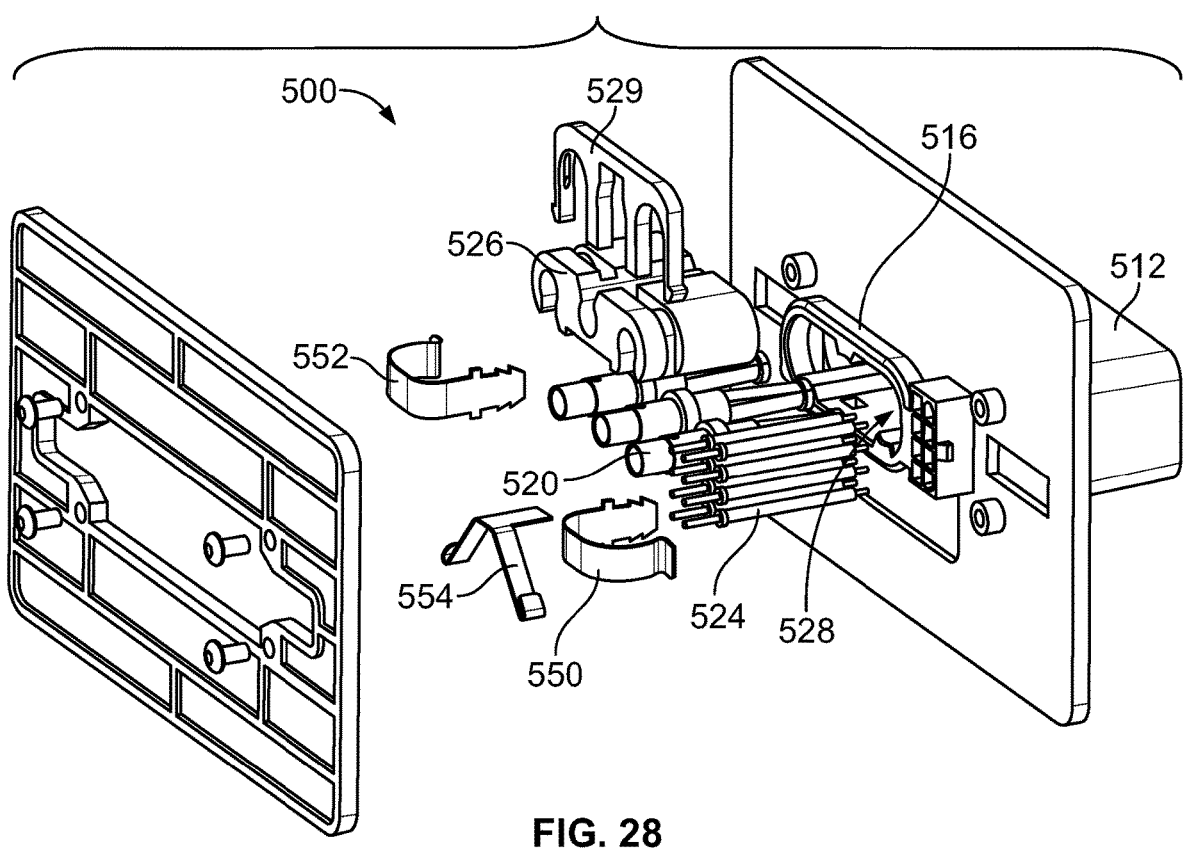
FIG. 28 is a rear perspective, exploded view of the supply charging device in accordance with an exemplary embodiment.

FIG. 28 is a rear perspective, exploded view of the supply charging device 500 in accordance with an exemplary embodiment. FIG. 28 illustrates the mounting springs 550, 552, 554 configured to be plugged into the supply housing 512. FIG. 28 illustrates the supply signal contacts 524 configured to be loaded into the supply housing 512. In the illustrated embodiment, the supply signal contacts 524 are pogo contacts; however, other types of contact may be used in alternative embodiments FIG. 28 illustrates the contact holder 526 used to hold the supply power contacts 520. The contact holder 526 is configured to be received in a cavity 528 of the supply base 516. The contact holder 526 holds the supply power contacts 520. The power wires 132 extend from the contact holder 526. In the illustrated embodiment, the supply power contacts 520 are configured be side loaded into corresponding contact channels in the contact holder 526, such as through the top side and/or the bottom side of the contact holder 526. In alternative embodiments, the supply power contacts 520 may be end loaded into the contact holder 526, such as through the rear end of the contact holder 526. In an exemplary embodiment, a contact lock 529 is used to lock the supply power contacts 520 in the contact holder 526. The contact holder 526, with the supply power contacts 520 loaded therein and the power wires 142 extending therefrom, is configured to be rear loaded into the cavity 528 of the supply base 516. The contact lock 529 is then coupled to the supply base 516 to lock the contact holder 526 in the cavity 528 and to lock the supply power contacts 520 in the contact holder 526.

Figure 29:
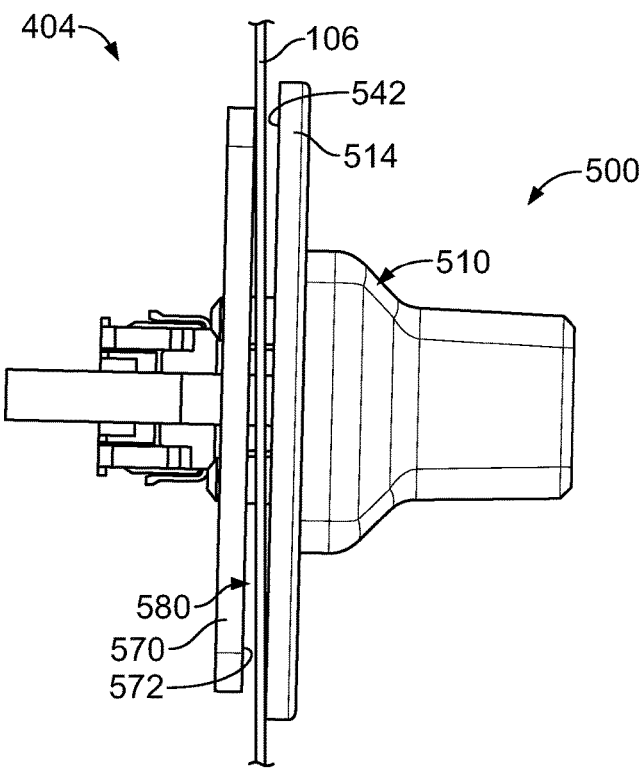
FIG. 29 is a perspective view of the charging component showing the supply charging device mounted to the panel in accordance with an exemplary embodiment.

FIG. 29 is a perspective view of the charging component 404 showing the supply charging device 500 mounted to the panel 106. The panel 106 is captured in a panel gap 580 between the front 572 of the retaining plate 570 and the rear 542 of the supply flange 514. The retaining plate 570 is coupled to the supply power connector 510 such that the retaining plate 570 is movable relative to the panel 106 with the supply power connector 510. In an exemplary embodiment, the panel gap 580 has a width greater than a width of the panel 106 to allow the supply power connector 510 to be angularly offset with respect to the panel 106. For example, the supply power connector 510 may be rotated relative to the panel 106 such that the supply flange 514 is nonparallel to the panel 106. The angular offset allows mating with the mobile charging device 600 in a mating direction nonperpendicular to the panel 106. In various embodiments, the supply power connector 510 may be angularly offset by approximately 5° relative to the panel 106. However, the amount of angular offset may be greater or less than 5° in alternative embodiments by controlling the panel gap width.

Figure 30:
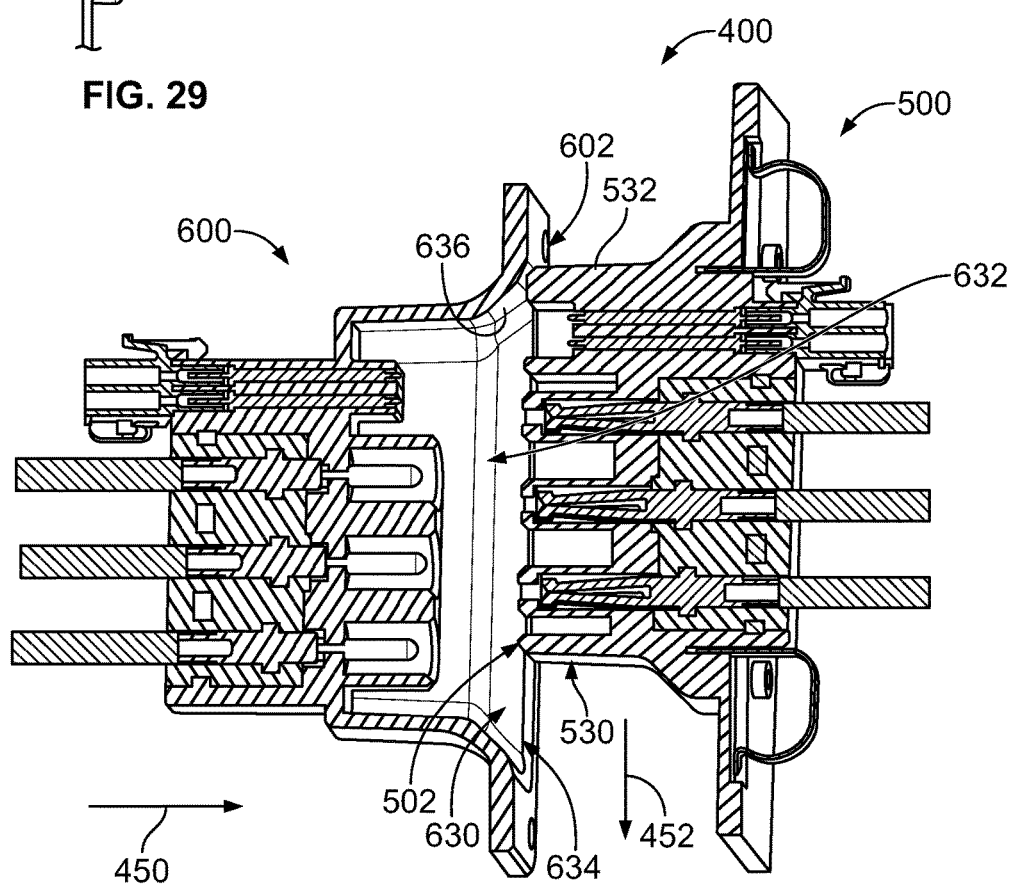
FIG. 30 is a cross-sectional view of the charging system in accordance with an exemplary embodiment showing the mobile charging device being mated with the supply charging device in a mating direction.

FIG. 30 is a cross-sectional view of the charging system 400 in accordance with an exemplary embodiment showing the mobile charging device 600 being mated with the supply charging device 500 in a mating direction 450. The mobile charging device 600 is offset or misaligned relative to the supply charging device 500. For example, in the illustrated embodiment, the mobile charging device 600 is horizontally offset (for example, to the right) relative to the supply charging device 500. The supply charging device 500 is movable relative to the panel 106 to align the mating end 502 of the supply charging device 500 with the mating end 602 of the mobile charging device 600. The guide member 530 engages the guide features 630 to align the mating ends 502, 602.

During mating, the nose 532 is received in the funnel 632 through the opening 634. As the mobile charging device 600 moves in the mating direction 450, the guide walls 636 engage the guide member 530 and forced the guide member 530 in an offsetting direction 452. In the illustrated embodiment, the offsetting direction 452 is in a sideways direction; however, the offsetting direction 452 may be in a different direction in alternative embodiments, including an upward direction, a downward direction and/or at another angular direction.

Figure 31:
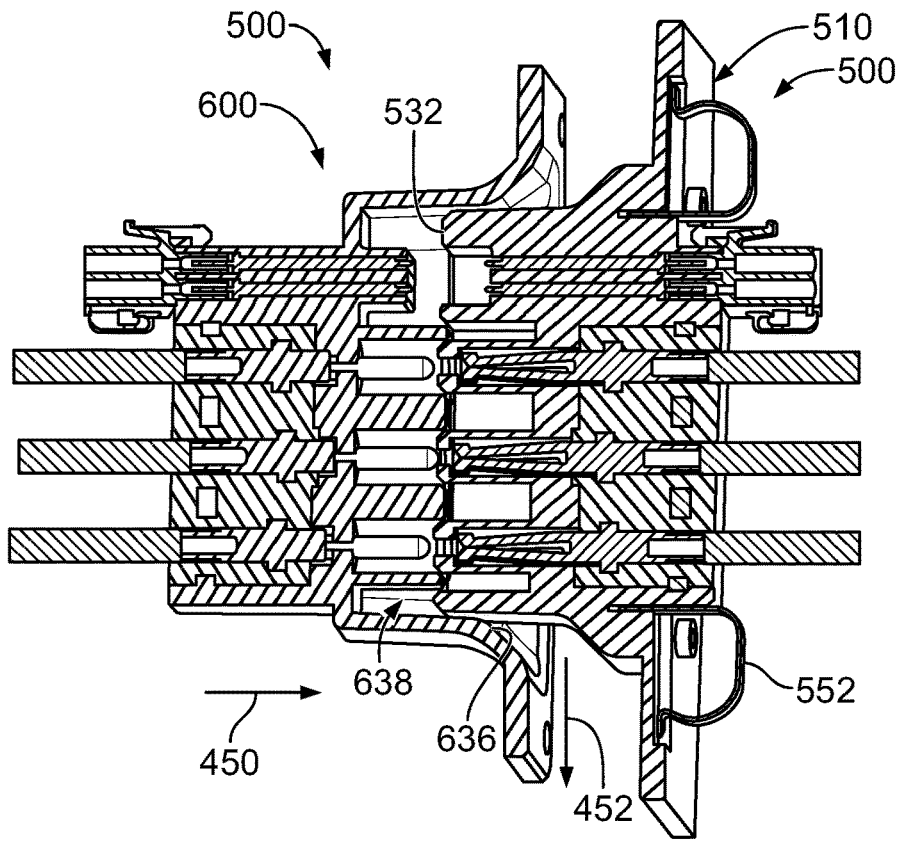
FIG. 31 is a cross-sectional view of the charging system in accordance with an exemplary embodiment showing the mobile charging device partially mated with the supply charging device in the mating direction.

FIG. 31 is a cross-sectional view of the charging system 400 in accordance with an exemplary embodiment showing the mobile charging device 600 partially mated with the supply charging device 500 in the mating direction 450. During mating, the mounting spring 552 is compressed as the supply power connector 510 is shifted in the offsetting direction 452. The supply power connector 510 is shifted relative to the panel 106 to align the nose 532 with the receptacle 638. The nose 532 rides along the guide wall 636 toward the receptacle 638 as the mobile charging device 600 is moved in the mating direction 450.

Figure 32:
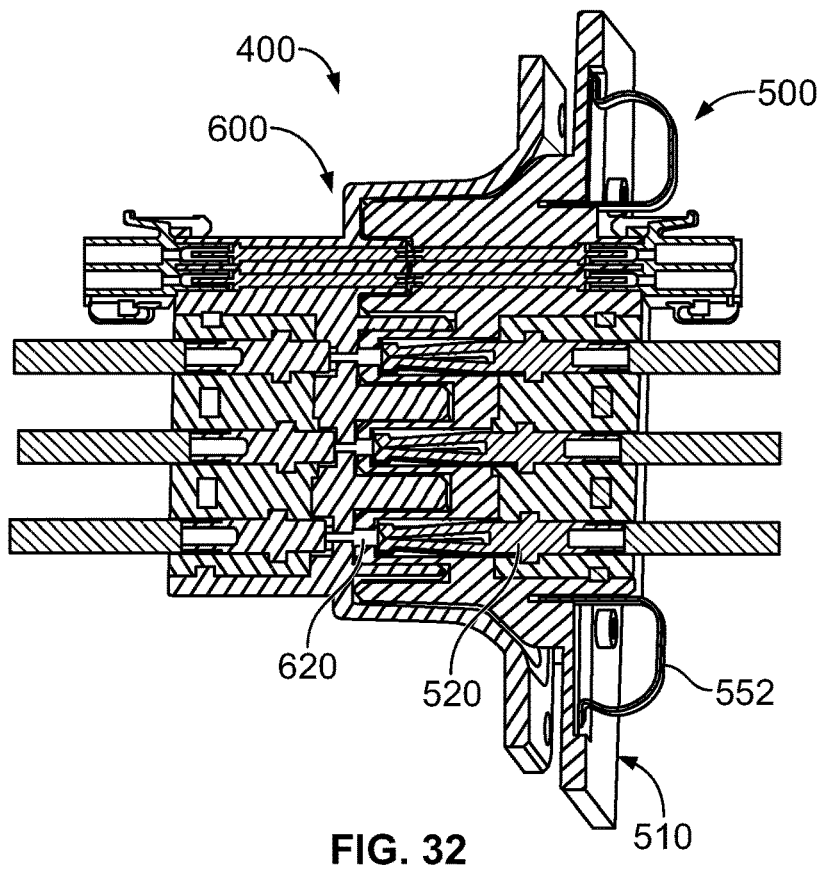
FIG. 32 is a cross-sectional view of the charging system in accordance with an exemplary embodiment showing the mobile charging device fully mated with the supply charging device.

FIG. 32 is a cross-sectional view of the charging system 400 in accordance with an exemplary embodiment showing the mobile charging device 600 fully mated with the supply charging device 500. The mounting spring 552 is compressed. The supply the connector 510 is shifted to the offset position relative to the panel 106. The supply power contacts 520 are mated with the receiver power contacts 620 in the mated position.

Figure 33:
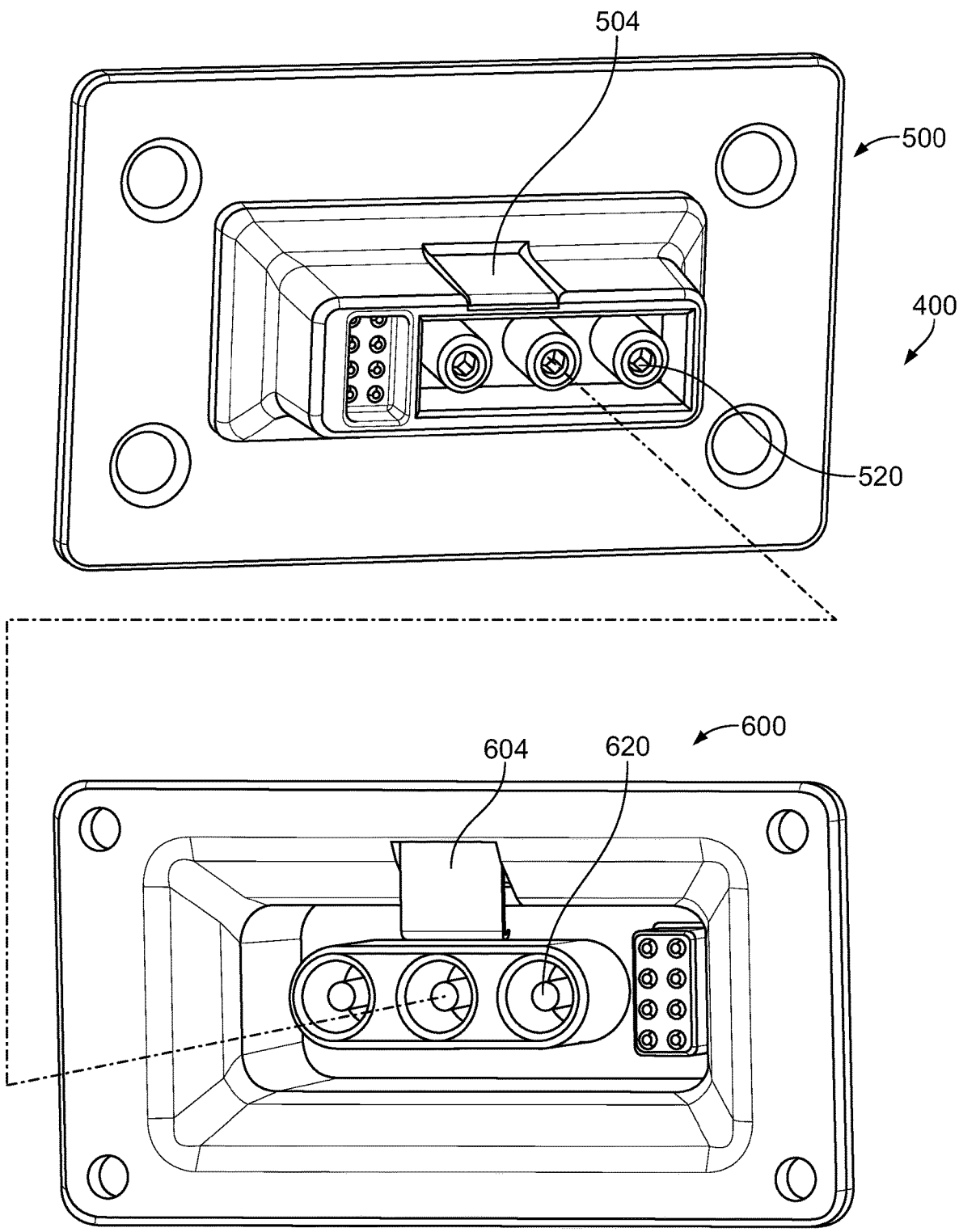
FIG. 33 illustrates the charging system in accordance with an exemplary embodiment.

FIG. 33 illustrates the charging system 400 in accordance with an exemplary embodiment. In the illustrated embodiment, the supply charging device 500 includes an electrostatic discharge contact 504 and the mobile charging device 600 includes an electrostatic discharge contact 604. The electrostatic discharge contact 504 engages the electrostatic discharge contact 604 when the mobile charging device 600 is mated with the supply charging device 500. In an exemplary embodiment, the electrostatic discharge contacts 504, 604 are mated prior to the power contacts 520, 620 being mated.

Figure 34:
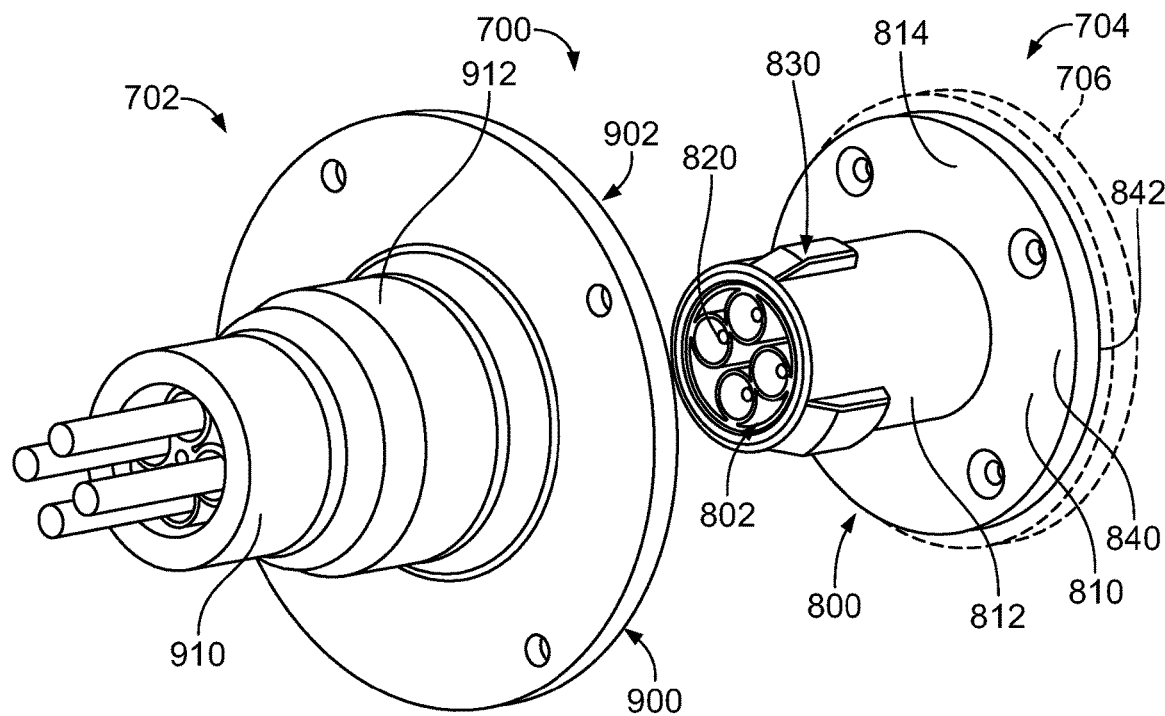
FIG. 34 illustrates a charging system in accordance with an exemplary embodiment including a supply charging device and a mobile charging device.
Figure 35:
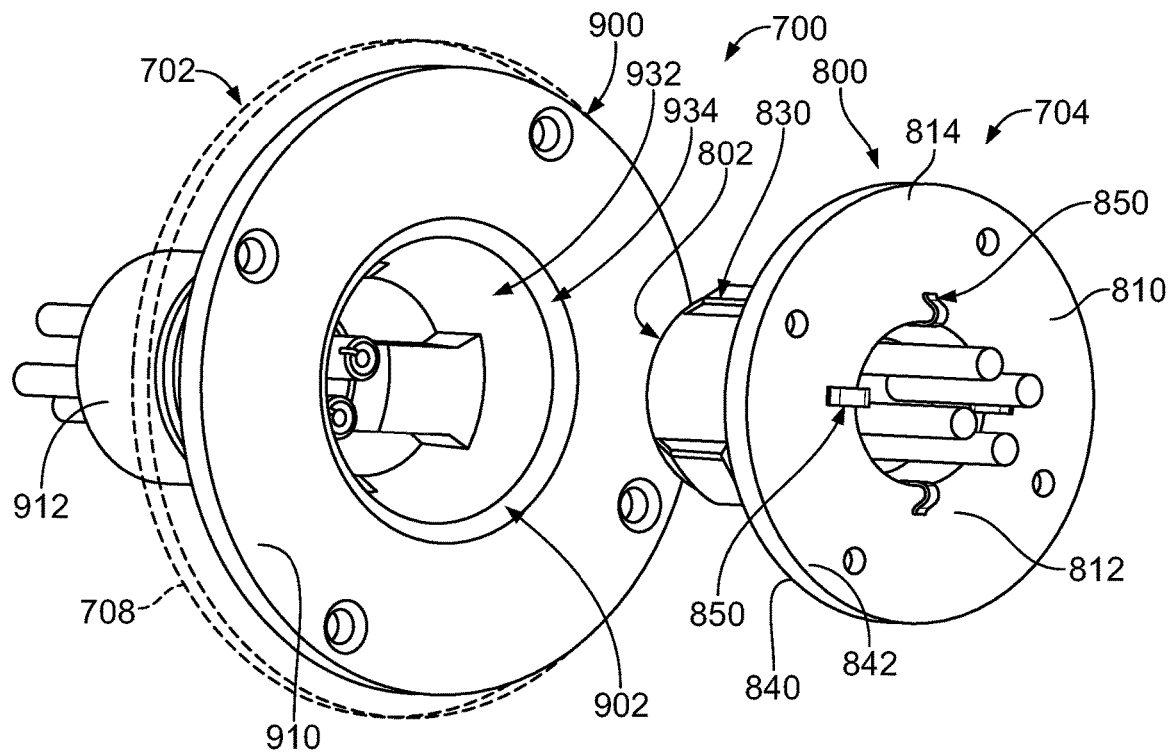
FIG. 35 illustrates the charging system in accordance with an exemplary embodiment including the supply charging device and the mobile charging device.

FIG. 34 illustrates a charging system 700 in accordance with an exemplary embodiment including a supply charging device 800 and a mobile charging device 900. FIG. 35 illustrates the charging system 700 in accordance with an exemplary embodiment including the supply charging device 800 and the mobile charging device 900. The charging system 700 is similar to the charging systems 100, 400; however, the charging devices are circular rather than being rectangular.

The mobile charging device 900 is provided on a mobile device 702 and includes a mating end 902 configured to be mated with the supply charging device 800. The supply charging device 800 is provided on a charging component 704 and includes a mating end 802 configured to be mated with the mobile charging device 900. The supply charging device 800 is configured to be coupled to a panel 706 (shown in FIG. 36). The mobile charging device 900 is configured to be coupled to a body 708 (shown in FIG. 36) of the mobile device 702. The mobile device 702 is configured to be separated from the charging component 704 and returned to the charging component 704 to recharge the mobile device 702. The mobile charging device 900 receives power from the supply charging device 800 when coupled thereto.

With reference to FIG. 35, the mobile charging device 900 includes a receiver power connector 910 having a receiver housing 912. The receiver housing 912 has a receiver flange 914 configured to be mounted to the body 708 of the mobile device 702. The receiver housing 912 holds receiver power contacts 920. The receiver housing 912 includes a guide feature 930 to guide mating of the mobile charging device 900 with the supply charging device 800. In an exemplary embodiment, the guide feature 930 includes a funnel 932 having an opening 934. The funnel 932 has angled guide walls 936 between the opening 934 and a receptacle 938. The guide walls 936 guide alignment of the supply charging device 800 and the mobile charging device 900 with the mobile device 702 returns to the charging component 704. The funnel 932 accommodates horizontal misalignment (for example, misalignment from either side) and accommodates vertical misalignment (for example, misalignment from above or from below).

With reference to FIG. 34, the supply charging device 800 includes a supply power connector 810 having a supply housing 812. The supply housing 812 extends between a front 840 and a rear 842. The mating end 802 is provided at the front 840 of the supply housing 812. The supply housing 812 has a supply flange 814 configured to be mounted to the panel 706. The supply housing 812 holds supply power contacts 820. The supply housing 812 includes a guide member 830 extending forward from the flange 814. The guide member 830 is configured to be received in the funnel 932 of the receiver housing 912 through the opening 934 to locate the supply charging device 800 relative to the mobile charging device 900. In an exemplary embodiment, the supply charging device 800 includes mounting springs 850 coupled to the supply housing 812 configured to engage the panel 106 to allow the supply power connector 810 to float relative to the panel 106 for alignment of the mating end 802 of the supply power connector 810 with the receiver power connector 910.

Figure 36:
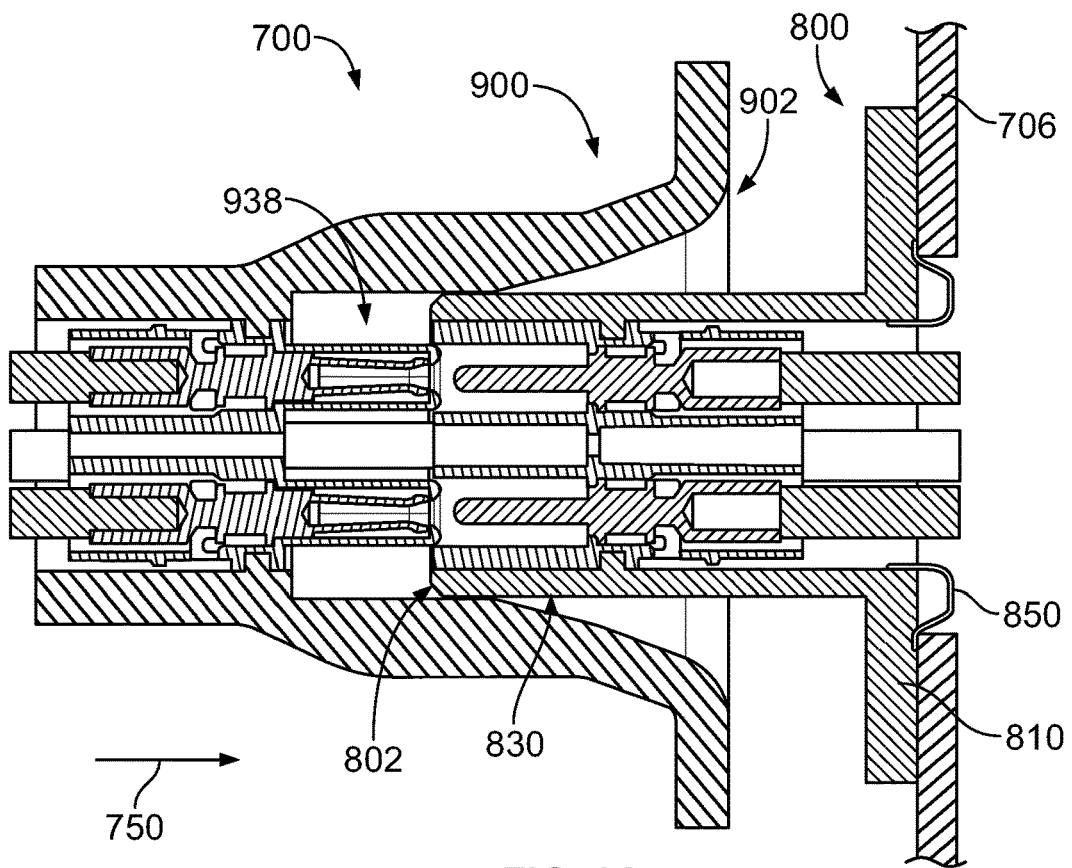
FIG. 36 is a cross-sectional view of the charging system in accordance with an exemplary embodiment showing the mobile charging device partially mated with the supply charging device.

FIG. 36 is a cross-sectional view of the charging system 700 in accordance with an exemplary embodiment showing the mobile charging device 900 partially mated with the supply charging device 800 in the mating direction 750. During mating, the mounting spring 850 allows floating movement of the supply power connector 810 to an offset position relative to the panel 706 to align the mating end 802 of the supply charging device 800 with the mating end 902 of the mobile charging device 900. The supply power connector 810 is shifted relative to the panel 706 to align the guide member 830 with the receptacle 938.

Figure 37:
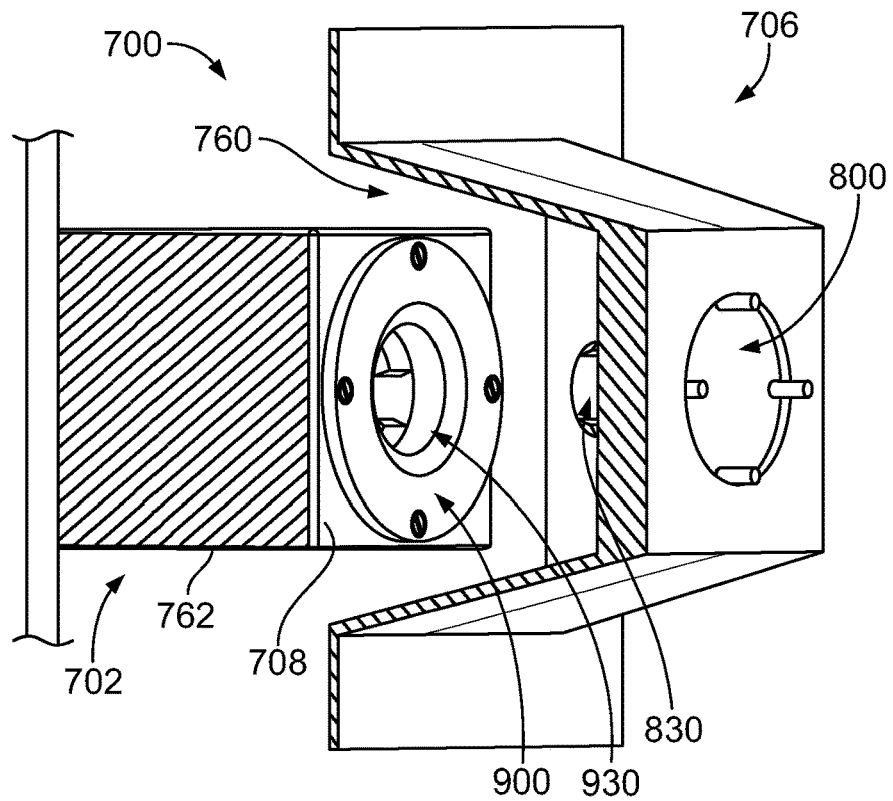
FIG. 37 is a perspective view of the charging system showing the supply charging device mated to the panel and the mobile charging device mated to the body of the mobile device in accordance with an exemplary embodiment.

FIG. 37 is a perspective view of the charging system 700 showing the supply charging device 800 mated to the panel 706 and the mobile charging device 900 mated to the body 708 of the mobile device 702. In an exemplary embodiment, the panel 706 includes an enclosure 760. The supply charging device 800 is mounted within the enclosure 760. The supply charging device 800 is recessed from a front of the panel 706 within the enclosure 760. The mobile device 702 includes a plug 762 extending outward from the body 708. The mobile charging device 900 is mounted to the plug 762. The plug 762 is configured to be received in the enclosure 760. The walls of the enclosure 760 are used to guide the plug 762. For example, the walls of the enclosure 760 may be used for course alignment of the mobile charging device 900 with the supply charging device 800. The guide feature 930 and the guide member 830 may then be used for fine alignment of the mobile charging device 900 with the supply charging device 800.

Figure 38:
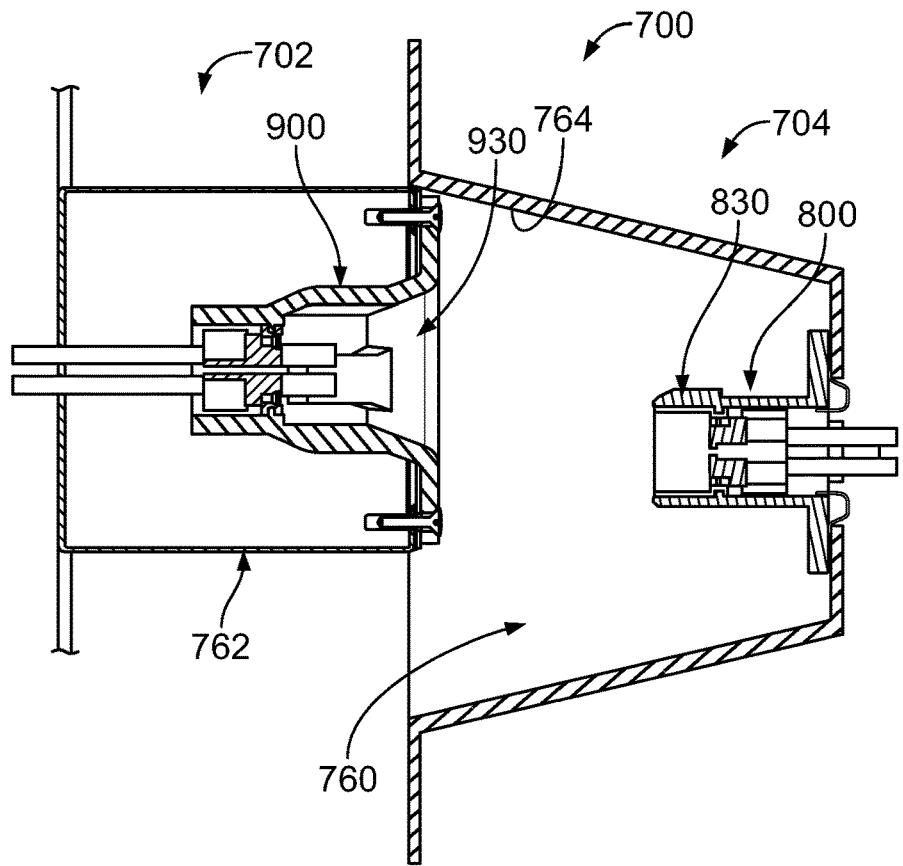
FIG. 38 is a cross-sectional view of the charging system showing the mobile device being mated with the charging component in accordance with an exemplary embodiment.

FIG. 38 is a cross-sectional view of the charging system 700 showing the mobile device 702 being mated with the charging component 704. The mobile charging device 900 is offset relative to the supply charging device 800. The enclosure 760 is used to guide the plug 762 into general alignment such that the guide feature 930 may be used to interface with the guide member 830 during mating of the mobile charging device 900 with the supply charging device 800. Enclosure walls 764 are angled from front to rear two center the plug 762 within the enclosure 760.

Figure 39:
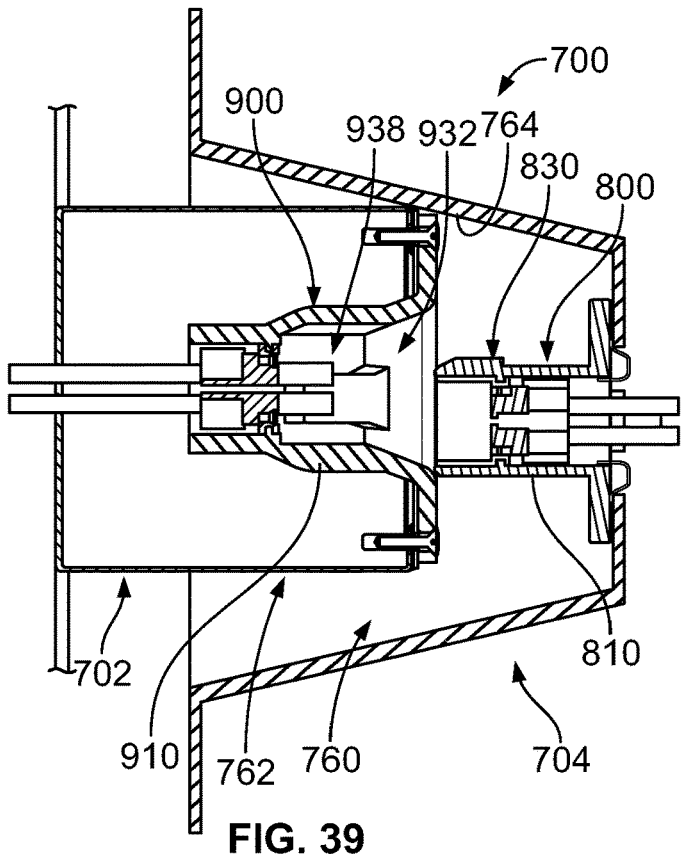
FIG. 39 is a cross-sectional view of the charging system showing the mobile device being mated with the charging component in accordance with an exemplary embodiment.

FIG. 39 is a cross-sectional view of the charging system 700 showing the mobile device 702 being mated with the charging component 704. The enclosure walls 764 guide the plug 762 toward the center of the enclosure 760. The enclosure walls 764 forced the plug 762 and the receiver power connector 910 into general alignment with the supply power connector 810. The guide member 830 is aligned with the funnel 932 by the enclosure walls 764. Further mating of the mobile charging device 900 with the supply charging device 800 causes the guide member 830 to be aligned with the receptacle 938. For example, the enclosure walls 764 and/or the funnel 932 may be used to orient the mobile charging device 900 and the supply charging device 800.

Figure 40:
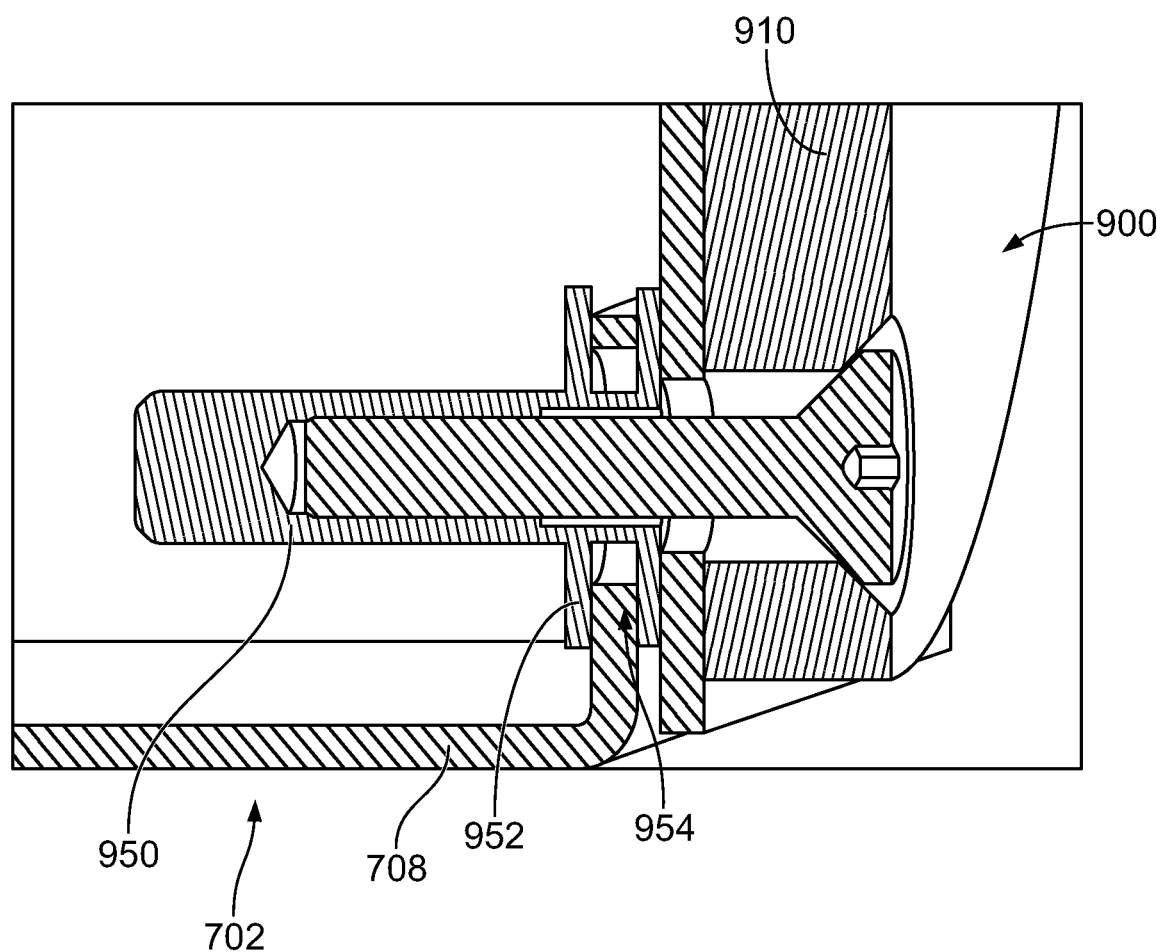
FIG. 40 is a cross-sectional view of a portion of the mobile charging device in accordance with an exemplary embodiment.

FIG. 40 is a cross-sectional view of a portion of the mobile charging device 900 in accordance with an exemplary embodiment. In the illustrated embodiment, the receiver power connector 910 of the mobile charging device 900 is coupled to the body 708 of the mobile device 702 by a floating coupler 950 to allow a limited amount of floating movement of the receiver power connector 910 relative to the body 708 of the mobile device 702. The floating coupler 950 includes a flange 952 having a groove 954 that receives the body 708. The groove 954 is oversized relative to the opening in the body 708 to allow a limited amount of floating movement of the floating coupler 950 relative to the body 708. As such, the receiver power connector 910 is able to move relative to the body 708, such as to align the receiver power connector 910 with the supply power connector 810 during mating.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A supply charging device for a mobile device, the supply charging device comprising:

a supply power connector having a housing extending between a front and a rear, the supply power connector having a mating end at the front, the housing having a flange configured to be mounted to a panel, the housing having a base extending rearward from the flange through a panel cutout in the panel, the housing including power contact channels extending through the base, the housing including a guide member extending forward from the flange, the guide member configured to engage a guide feature of the mobile device to locate a receiver power connector of the mobile device relative to the supply power connector of the mobile device, the supply power connector including power contacts received in the power contact channels;

a retaining plate coupled to the rear of the housing, a panel gap being defined between the retaining plate and the rear of the housing with the panel received between the flange and the retaining plate;

a mounting spring coupled to the housing, the mounting spring extending rearward of the flange, the mounting spring being received in the panel cutout, the mounting spring configured to engage the panel to allow the supply power connector to float relative to the panel within the panel cutout for aligning the mating end of the supply power connector with the receiver power connector.

2. The supply charging device of claim 1, wherein the mounting spring includes a fixed end coupled to the housing and a free end configured to be coupled to the panel, the mounting spring being compressible to allow the housing to move relative to the panel to change a position of the mating end of the supply power connector relative to the panel for mating with the receiver power connector.

3. The supply charging device of claim 1, wherein the housing includes a locating feature received in the cutout, the locating feature configured to engage the panel to control an amount of floating movement of the supply power connector relative to the panel.

4. The supply charging device of claim 1, wherein the mounting spring biases the supply power connector to a resting position relative to the panel, the supply power connector movable from the resting position to an offset position, the mounting spring returning the supply power connector from the offset position to the resting position when the supply power connector is released.

5. The supply charging device of claim 1, wherein the supply power connector is movable by the receiver power connector when the receiver power connector engages the supply power connector.

6. The supply charging device of claim 1, wherein the mounting spring is a first mounting spring, the supply charging device further comprising a second mounting spring, the first mounting spring biasing the supply power connector relative to the panel in a first direction, the second mounting spring biasing the supply power connector relative to the panel in a second direction, the second direction being parallel to and opposing the first direction.

7. The supply charging device of claim 6, further comprising a third mounting spring, the third mounting spring biasing the supply power connector relative to the panel in a third direction, the third direction being perpendicular to the first direction and the second direction.

8. The supply charging device of claim 1, wherein the mounting spring allows floating movement of the supply power connector relative to the panel of at least 10 mm.

9. The supply charging device of claim 1, wherein the guide member has a width and a height, the mounting spring allowing floating movement of the supply power connector a floating offset distance of at least 10% of the width or at least 10% of the height.

10. The supply charging device of claim 1, wherein the guide member includes a nose and a cone between the nose and the flange, the nose engaging the guide feature of the mobile device to locate the supply power connector relative to the receiver power connector.

11. The supply charging device of claim 10, wherein the guide feature includes a funnel extending to a receptacle, the nose being received in the funnel to align the nose with the receptacle, the supply power connector floating relative to the panel to an offset position as the nose is aligned with the receptacle.

12. The supply charging device of claim 1, wherein the supply power connector includes signal contact channels and signal contacts received in the signal contact channels.

13. The supply charging device of claim 1, wherein the base includes a rear cavity, the supply power connector including a power contact holder holding the power contacts, the power contact holder received in the rear cavity.

14. The supply charging device of claim 1, wherein the panel gap has a panel gap width, the panel gap width being wider than the panel to allow the supply power connector to be angularly offset with respect to the panel.

15. The supply charging device of claim 1, wherein the supply power connector includes an electrostatic discharge contact configured to be mated with the receiver power connector.

16. A charging system comprising:
a mobile charging device including a receiver power connector having a receiver housing extending between a front and a rear, the receiver power connector having a mating end at the front, the receiver housing having a receiver flange configured to be mounted to a body of a mobile device, the receiver housing having a receiver base extending rearward from the receiver flange through a body cutout in the body of the mobile device, the receiver housing including receiver power contact channels extending through the receiver base, the receiver housing including a funnel having an opening, the funnel having angled guide walls between the opening and a receptacle at the receiver base, the receiver power connector including receiver power contacts received in the receiver power contact channels, the receiver power contacts extending into the receptacle; and
a supply charging device including a supply power connector having a supply housing extending between a front and a rear, the supply power connector having a mating end at the front, the supply housing having a supply flange configured to be mounted to a panel, the supply housing having a supply base extending rearward from the supply flange through a panel cutout in the panel, the supply housing including supply power contact channels extending through the supply base, the supply housing including a guide member extending forward from the flange, the guide member being received in the funnel of the receiver housing through the opening to locate the supply charging device relative to the mobile charging device, the supply power connector including supply power contacts received in the supply power contact channels, the mating end of the supply power connector being received in the receptacle such that the supply power contacts are mated to the receiver power contacts, the supply charging device including a retaining plate coupled to the rear of the supply housing used to mount the supply power connector to the panel, the supply charging device including a mounting spring coupled the supply housing, the mounting spring extending rearward of the supply flange, the mounting spring engaging the panel to allow the supply power connector to float relative to the panel for aligning the mating end of the supply power connector with the receiver power connector.

17. An autonomous mobile device comprising:
a mobile body movable relative to a supply charging device to perform a task and return to the supply charging device to recharge the autonomous mobile device;
a mobile charging device mounted to the mobile body, the mobile charging device being mated to the supply charging device to recharge the autonomous mobile device, the mobile charging device including a receiver power connector having a receiver housing extending between a front and a rear, the receiver power connector having a mating end at the front, the receiver housing having a receiver flange mounted to the mobile body, the receiver housing having a receiver base extending rearward from the receiver flange through a body cutout in the mobile body, the receiver housing including receiver power contact channels extending through the receiver base, the receiver housing including a funnel having an opening, the funnel having angled guide walls between the opening and a receptacle at the receiver base, the receiver power connector including receiver power contacts received in the receiver power contact channels, the receiver power contacts extending into the receptacle; and the supply charging device including a supply power connector having a supply housing extending between a front and a rear, the supply power connector having a mating end at the front, the supply housing having a supply flange configured to be mounted to a panel, the supply housing having a supply base extending rearward from the supply flange through a panel cutout in the panel, the supply housing including supply power contact channels extending through the supply base, the supply housing including a guide member extending forward from the flange, the guide member being received in the funnel of the receiver housing through the opening to locate the supply charging device relative to the receiver charging device, the supply power connector including supply power contacts received in the supply power contact channels, the mating end of the supply power connector being received in the receptacle such that the supply power contacts are mated to the receiver power contacts, the supply charging device including a retaining plate coupled to the rear of the supply housing used to mount the supply power connector to the panel, the supply charging device including a mounting spring coupled the supply housing, the mounting spring extending rearward of the supply flange, the mounting spring engaging the panel to allow the supply power connector to float relative to the panel for aligning the mating end of the supply power connector with the receiver power connector.

18. The autonomous mobile device of claim 17, wherein the mounting spring includes a fixed end coupled to the supply housing and a free end configured to be coupled to the panel, the mounting spring being compressible to allow the supply housing to move relative to the panel to change a position of the mating end of the supply power connector relative to the panel for mating with the receiver power connector.

19. The autonomous mobile device of claim 17, wherein the supply housing includes a locating feature received in the panel cutout, the locating feature configured to engage the panel to control an amount of floating movement of the supply power connector relative to the panel.

20. The autonomous mobile device of claim 17, wherein the mounting spring biases the supply power connector to a resting position relative to the panel, the supply power connector movable from the resting position to an offset position, the mounting spring returning the supply power connector from the offset position to the resting position when the supply power connector is released.

* * * * *